(12) United States Patent
Demski et al.

(10) Patent No.: US 11,827,286 B2
(45) Date of Patent: Nov. 28, 2023

(54) IMPLEMENT RECOGNITION LIGHTING

(71) Applicant: Deere & Company, Moline, IL (US)

(72) Inventors: Nathan R. Demski, Durango, IA (US); Brian M. Huenink, Cedar Grove, WI (US); Eric A. Keen, Manhattan, KS (US)

(73) Assignee: Deere & Company, Moline, IL (US)

( * ) Notice: Subject to any disclaimer, the term of this patent is extended or adjusted under 35 U.S.C. 154(b) by 386 days.

(21) Appl. No.: 16/949,420

(22) Filed: Oct. 29, 2020

(65) Prior Publication Data

US 2021/0339809 A1 Nov. 4, 2021
US 2023/0140830 A2 May 4, 2023

Related U.S. Application Data

(60) Provisional application No. 63/017,978, filed on Apr. 30, 2020.

(51) Int. Cl.
*B60Q 1/24* (2006.01)
*B62D 49/06* (2006.01)
*F21S 41/657* (2018.01)
*H05B 47/115* (2020.01)
*A01B 76/00* (2006.01)
*H05B 47/155* (2020.01)

(52) U.S. Cl.
CPC .......... *B62D 49/0614* (2013.01); *A01B 76/00* (2013.01); *F21S 41/657* (2018.01); *H05B 47/115* (2020.01); *H05B 47/155* (2020.01); *Y02B 20/40* (2013.01)

(58) Field of Classification Search
CPC .......... B60Q 1/24; B60Q 1/085; B60Q 1/143; B60Q 1/245; H05B 47/115; H05B 47/155
See application file for complete search history.

(56) References Cited

U.S. PATENT DOCUMENTS

| | | | |
|---|---|---|---|
| 9,527,493 B2 | 12/2016 | Von Mezynski | |
| 9,809,154 B2 * | 11/2017 | Funk | B60Q 1/143 |
| 10,023,106 B2 | 7/2018 | Gresch | |
| 10,106,072 B2 | 10/2018 | Linan et al. | |
| 2010/0290774 A1 * | 11/2010 | Matsuoka | H05B 47/11 |
| | | | 362/11 |

(Continued)

FOREIGN PATENT DOCUMENTS

| | | |
|---|---|---|
| EP | 2158799 A1 | 3/2010 |
| EP | 2172366 A1 | 4/2010 |

(Continued)

OTHER PUBLICATIONS

Extended European Search Report and Written Opinion issued in European Patent Application No. 21165325.8, dated Sep. 17, 2021, in 09 pages.

(Continued)

*Primary Examiner* — Tung X Le

(57) ABSTRACT

Systems and methods for targeted illumination of an object coupled to a machine, such as an implement coupled to an agricultural vehicle, are disclosed. The systems and methods include sensing an area adjacent to the machine, determining whether an implement is present in the sensed area, and providing targeted illumination to the detected object while avoiding the provision of light to the area that is not occupied by the object.

20 Claims, 23 Drawing Sheets

(56) References Cited

U.S. PATENT DOCUMENTS

| | | | |
|---|---|---|---|
| 2015/0003087 A1* | 1/2015 | Futamura | B60Q 9/008 |
| | | | 362/466 |
| 2018/0271015 A1 | 9/2018 | Redden et al. | |
| 2018/0319317 A1* | 11/2018 | Plank | B60Q 1/143 |
| 2019/0385025 A1* | 12/2019 | McMichael | G06K 9/6256 |
| 2020/0041999 A1* | 2/2020 | Pfaff | E02F 9/2033 |
| 2021/0061164 A1* | 3/2021 | Kursar | B60Q 1/18 |

FOREIGN PATENT DOCUMENTS

| | | |
|---|---|---|
| EP | 3130211 A1 | 2/2017 |
| EP | 3363684 A1 | 8/2018 |
| EP | 3483006 A1 | 5/2019 |
| WO | WO2016112387 A1 | 7/2016 |
| WO | WO 2018175641 A1 | 9/2018 |
| WO | WO 2019036674 A1 | 2/2019 |

OTHER PUBLICATIONS

Mnih, V. et al., Asynchronous Methods for Deep Reinforcement Learning, dated Jun. 16, 2016, pp. 1-19.

Mnih, V. et al., Playing Atari with Deep Reinforcement Learning, dated Dec. 19, 2013, pp. 1-9.

Lillicrap, T. et al., Continuous control with deep reinforcement learning, Published as a conference paper at ICLR 2016, dated Jul. 5, 2019, pp. 1-14.

* cited by examiner

1. Initialization
   $V(s) \in \mathcal{R}$ and $\pi(s) \in \mathcal{A}(s)$ arbitrarily for all $s \in \mathcal{S}$ 2. Policy Evaluation
   Repeat
   $\Delta \leftarrow 0$
   For each $s \in \mathcal{S}$:
   $v \leftarrow V(s)$
   $V(s) \leftarrow \sum_{s'} \mathcal{P}_{ss'}^{\pi(s)} \left[ \mathcal{R}_{ss'}^{\pi(s)} + \gamma V(s') \right]$
   $\Delta \leftarrow \max(\Delta, |v - V(s)|)$
   until $\Delta < \theta$ (a small positive number)

3. Policy Improvement
   *policy-stable* $\leftarrow$ *true*
   For each $s \in \mathcal{S}$:
   $b \leftarrow \pi(s)$
   $\pi(s) \leftarrow \arg\max_a \sum_{s'} \mathcal{P}_{ss'}^{a} \left[ \mathcal{R}_{ss'}^{a} + \gamma V(s') \right]$
   If $b \neq \pi(s)$, then *policy-stable* $\leftarrow$ *false*
   If *policy-stable*, then stop; else go to 2

FIG. 17

Initialize $V$ arbitrarily, e.g., $V(s) = 0$, for all $s \in \mathcal{S}^+$

Repeat
   $\Delta \leftarrow 0$
   For each $s \in \mathcal{S}$:
     $v \leftarrow V(s)$
     $V(s) \leftarrow max_a \sum_{s'} \mathcal{P}^a_{ss'}[\mathcal{R}^a_{ss'} + \gamma V(s')]$
     $\Delta \leftarrow max(\Delta, |v - V(s)|)$
   until $\Delta < \theta$ (a small positive number)

Output a deterministic policy, $\pi$, such that
   $\pi(s) = arg\ max_a \sum_{s'} \mathcal{P}^a_{ss'}[\mathcal{R}^a_{ss'} + \gamma V(s')]$

FIG. 18

Initialize $V(s)$ arbitrarily, $\pi$ to the policy to be evaluated
Repeat (for each episode)
   Initialize $s$
   Repeat (for each step of episode):
     $a \leftarrow$ action given by $\pi$ for $s$
     Take action $a$; observe reward, $r$, and next state, $s'$
     $V(s) \leftarrow V(s) + \alpha[r + \gamma V(s') - V(s)]$
     $s \leftarrow s'$
   until $s$ is terminal

FIG. 19

Initialize $Q(s, a)$ arbitrarily
Repeat (for each episode)
    Initialize $s$
    Repeat (for each step of episode):
        Choose $a$ from $s$ using policy derived from $Q$ (e.g., $\varepsilon$-greedy)
        Take action $a$, observe $r, s'$
        $Q(s, a) \leftarrow Q(s, a) + \alpha[r + \gamma \max_{a'} Q(s', a') - Q(s, a)]$
        $s \leftarrow s'$;
    until $s$ is terminal

FIG. 20

IMPLEMENT RECOGNITION LIGHTING

CROSS-REFERENCE TO RELATED APPLICATIONS

This application claims the benefit of U.S. Provisional Application No. 63/017,978, filed Apr. 30, 2020, the entire contents of which are incorporated herein by reference.

FIELD OF THE DISCLOSURE

The present disclosure relates generally to exterior illumination of a work vehicle.

BACKGROUND OF THE DISCLOSURE

Agricultural operations, such as planting and harvesting, are time-sensitive. A narrow window of time exists to complete planting and harvesting activities. Factors, such as weather or other considerations, may contribute to an urgency to complete the time-sensitive operations. Therefore, nighttime farming operations are performed in order to complete planting operations or harvesting in a timely manner.

In order to complete nighttime farming operations, exterior illumination is used. The illumination allows an operator to conduct nighttime operations.

SUMMARY OF THE DISCLOSURE

A first aspect of the present disclosure is directed to an illumination control system. The illumination control system may include a lighting system that includes a plurality of light sources having an arrangement in which each light source provides selective illumination to different regions of an area; a sensor that detects an object within the area; and a controller communicably coupled to the lighting system and the sensor. The controller may receive a signal from the sensor indicative of a condition of the area and determine whether the condition reflects an object being positioned adjacent to the lighting system. The controller may selectively activate one or more of the plurality of light sources to provide targeted illumination to illuminate a detected object while preventing illumination to portions of the area not occupied by the detected object.

Another aspect of the present disclosure is directed to a method of selectively illuminating an area. The method may include sensing, with a sensor, a condition of an area; determining the presence of an object within the area based on the sensed condition using machine learning; and selectively actuating one or more light sources to provide targeted illumination to a portion of the area occupied by a detected object and prevent actuating one or more other light sources that provides illumination to portions of the area not occupied by the detected object.

Another aspect of the present disclosure is directed to an agricultural vehicle that may include a body; an implement connector; a lighting system coupled to a first portion of the body, the lighting system that includes a plurality of light sources; a plurality of sensors distributed along a second portion of the body that senses an area adjacent to at least a portion of the body; and a controller communicably coupled to the lighting system and the plurality of sensors. The controller may be operable to receive signals from the plurality of sensor, determine the presence of an implement within the sensed area, and selectively actuate one or more of the light sources to provide targeted illumination to a detected implement while preventing actuation of other light sources of the plurality of light sources that would provide illumination to a portion of the area not occupied by the detected implement.

Other features and aspects will become apparent by consideration of the detailed description and accompanying drawings.

BRIEF DESCRIPTION OF THE DRAWINGS

The detailed description of the drawings refers to the accompanying figures in which:

FIGS. 17 through 20 are illustrations of example reinforcement learning systems, according to some implementations of the present disclosure.

DETAILED DESCRIPTION

Figure 1:
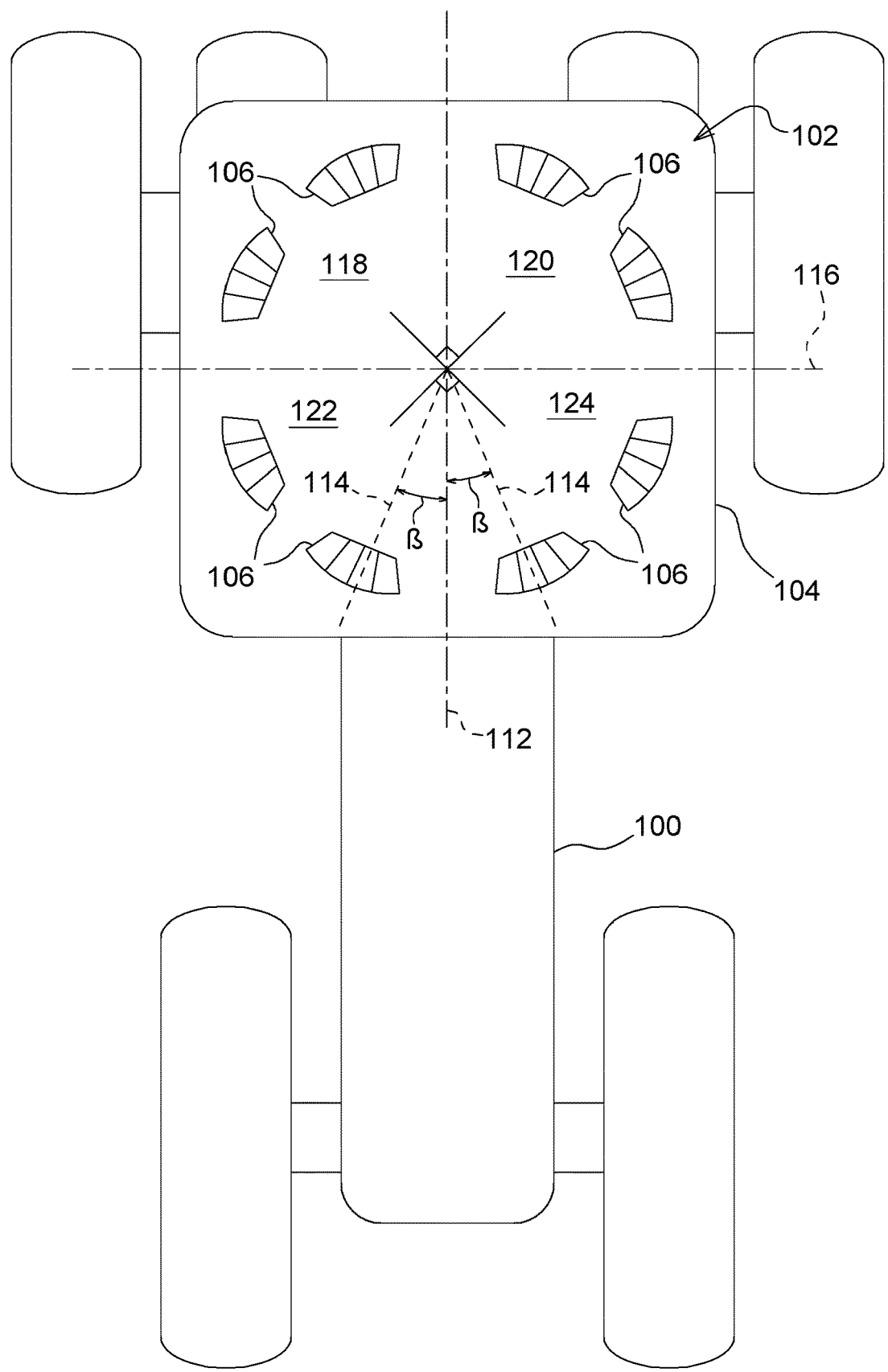
FIG. 1 is a top view of an example vehicle that includes a lighting system attached to a roof of the vehicle, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Exterior illumination of agricultural equipment during nighttime agricultural operations is important because exterior illumination effectively increases a time period during which agricultural operations may be performed. This can be important when producers have a narrow time frame for performing agricultural operations, such as planting or harvesting. Exterior illumination increases safety for nighttime operations and provides for nighttime operations in general. For example, exterior illumination during nighttime operations allows producers to avoid obstacles, visually track a path through a field, and monitor equipment, for example. However, an excessive amount of light close to a vehicle, such as a tractor, can create glare that actually reduces a distance beyond the vehicle that the operator can see and can decrease operator comfort and increase operator fatigue.

With a reduced brightness or a change in direction of the illumination, operator visibility beyond the vehicle is enhanced such that the operator can see a distance farther from the vehicle. Consequently, a reduced amount of light used and a reduction in glare are provided. Additionally, a selected brightness level of light directed to an implement, for example, may be varied depending on a distance the implement or portion of the implement is from the light source. Thus, a brightness level of light targeted to an object, such as an implement, may be controlled, which may reduce eye fatigue of an operator of the vehicle. As a result, operator comfort is increased, and power consumption is reduced. By selectively operating lights to produce selective illumination, fuel may be conserved, more electrical power may be transmitted to an implement, or both.

The present disclosure is directed to exterior illumination for use during, for example, agricultural operations occurring during the night or other low ambient light level conditions. Although the illumination concepts described herein are provided in the context of agricultural operations, the scope of the disclosure is not so limited. Rather, the concepts presented herein are applicable areas outside of agriculture, such a construction, forestry, or other areas. Particularly, the present application is directed to providing targeted light to desired areas in relation to a work vehicle, such as a tractor. For example, light may be targeted towards a particular implement, or portion thereof, attached to a tractor. However, the amount of light, which may include areal spread and brightness, and direction of light produced may be selected based on a size and position of the attached implement. Thus, light is selectively provided at one or more desired areas and at brightness levels to provide a desired lighting level. For example, brightness of the light may be varied depending on a configuration of the coupled implement relative to the tractor. Configuration may include a position of the implement relative to the tractor (e.g., a side of the tractor on which the implement is located, a height at which that the implement is positioned above the ground or otherwise relative to the tractor), a longitudinal displacement of the implement from the tractor, a lateral extent (i.e., a distance that the implement extends laterally away from the tractor) or lateral displacement of the implement from the vehicle, or a combination of these. For example, for an implement that laterally extends a greater distance from a vehicle, light with a greater brightness may be provided to portions of the implement having a greater distance from the vehicle. For portions of the implement that is closer to the vehicle, light with a reduced brightness may be used.

Further, a direction in which light is projected relative to the vehicle (such as relative to a longitudinal axis of the vehicle) may also be varied depending, for example, on a lateral extend of an attached implement. For example, as an implement's lateral extent increases, a brightness of the light may be increased; an angular direction relative to the vehicle in which the light emitted may be increased; and an angular distribution of the light may be increased; or a combination of these may be utilized. Similarly, as the lateral extend of an attached implement is reduced, a brightness of the light may be decreased; an angular direction relative to the vehicle in which the light emitted may be decreased; angular distribution of the light may be reduced; or a combination of these may be utilized.

Still further, the present disclosure also provides for automated detection of an implement coupled to a vehicle and automated adjustment of light projected towards the detected implement in both light brightness, direction, and areal coverage. Variations in the brightness, direction, and areal coverage of light may be automatically performed based on identification of objects, such as implements attached to the vehicle. For example, one or more cameras may be used to collect data used to detect the presence of an attached implement. Implements subject to detection may be coupled at any location of the vehicle, such as at a forward end of a vehicle, at a trailing end of the vehicle, or at different positions fore or aft of the vehicle, such as where numerous implements are coupled together to form a train at an aft end of a vehicle. One or more cameras or other sensors may also be used to collect data used to detect objects adjacent to a vehicle and automatically provide targeted illumination in response. The targeted illumination may vary depending on a size of the implement, e.g., a lateral extent of the implement. For example, the targeted illumination provided may be varied based on the size of the implement to fully illuminate the implement.

The targeted illumination reduces excessive light projected into the area adjacent to the vehicle, such as into a dark field adjacent to a tractor, reducing glare and operator eye fatigue. For example, targeted illumination reduces emitted light that is not used to illuminate an implement. As a result, where two or more vehicles are operating in a common space, errant light emitted by one vehicle is reduced, thereby reducing glare to an operator in another of the vehicles. The targeted illumination also reduces shadow lines on the implement, providing for improved visibility of the implement by an operator of the vehicle. Consequently, the targeted illumination improves visibility and comfort of the vehicle operator.

At a high level, in some implementations, one or more images from one or more cameras are analyzed to detect for a presence of one or more implements coupled to a vehicle and one or more lights are operated in order to illuminate the detected implements at a selected direction, areal coverage, and brightness. In some implementations, machine learning is utilized to analyze the obtained images to determine whether an implement is present, determine a position and size of a detected implement or implements, and selectively activate light sources to provide a desired level of illumination to the detected implement or implements. Further, particular light fixtures or light sources of one or more lighting fixtures may be selectively illuminated in order to provide targeted illumination of the detected implement or implements. In some implementations, selectively activating light sources may include activating one or more light sources of a light fixture to provide illumination at a selected level of brightness for each of the activated light sources.

FIG. 1 is a top view of an example vehicle 100 that includes a lighting system 102 attached to a roof 104 of the vehicle 100. Although the lighting system 102 is described as being attached to the roof 104 of the vehicle 100, in other implementations, one or more components of the lighting system 102 may be attached to other parts of the vehicle 100. In the present example, the vehicle 100 is a tractor. In other implementations, the vehicle 100 may be another type of agricultural vehicle, such as a combine harvester, or a type of vehicle outside of the agricultural arts. The present disclosure is intended to encompass any type of vehicle.

Figure 2:
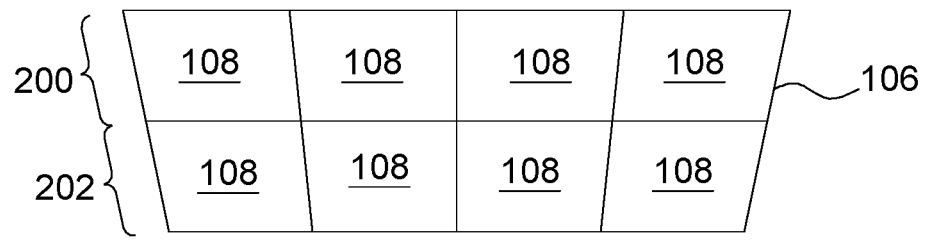
FIG. 2 is a front view of an example light fixture containing a plurality of light sources, according to some implementations of the present disclosure.

In the illustrated example, the lighting system 102 includes eight light fixtures 106, and, as shown in FIG. 2, each light fixture 106 includes eight individual light sources 108. The light sources 108 may be any type of light source. For example, the light sources 108 may be light emitting diodes (LED), incandescent, halogen, fluorescent, sodium-vapor, high-intensity discharge, metal halide, or other types of light technologies. Further, the light sources 108 of a light fixture 106 may be identical, or the light fixture 106 may include light sources 108 made of different types of light technologies.

Referring again to FIG. 1, the example lighting system 102 is configured symmetrically, with each light fixture 106 arranged radially from a center 110. Each light fixtures 106 is angularly offset from adjacent light fixtures 106 by 45°. Further, in the illustrated example, the light fixtures 106 are arranged such that a longitudinally axis 112 of the vehicle 100 extends between adjacent light fixtures 106, bisecting an angle formed therebetween. Thus, an angle, β, formed between radials 114 associated with the light fixtures 106 between which the longitudinal axis 112 extends and the longitudinal axis 112 is 22.5°. With the described and illustrated arrangement, the light fixtures 106 are arranged symmetrically about the longitudinal axis 112 and a lateral axis 116 extending perpendicular to the longitudinal axis 112. Consequently, two light fixtures 106 are disposed in each of the four quadrants 118, 120, 122, and 124.

Figure 9:
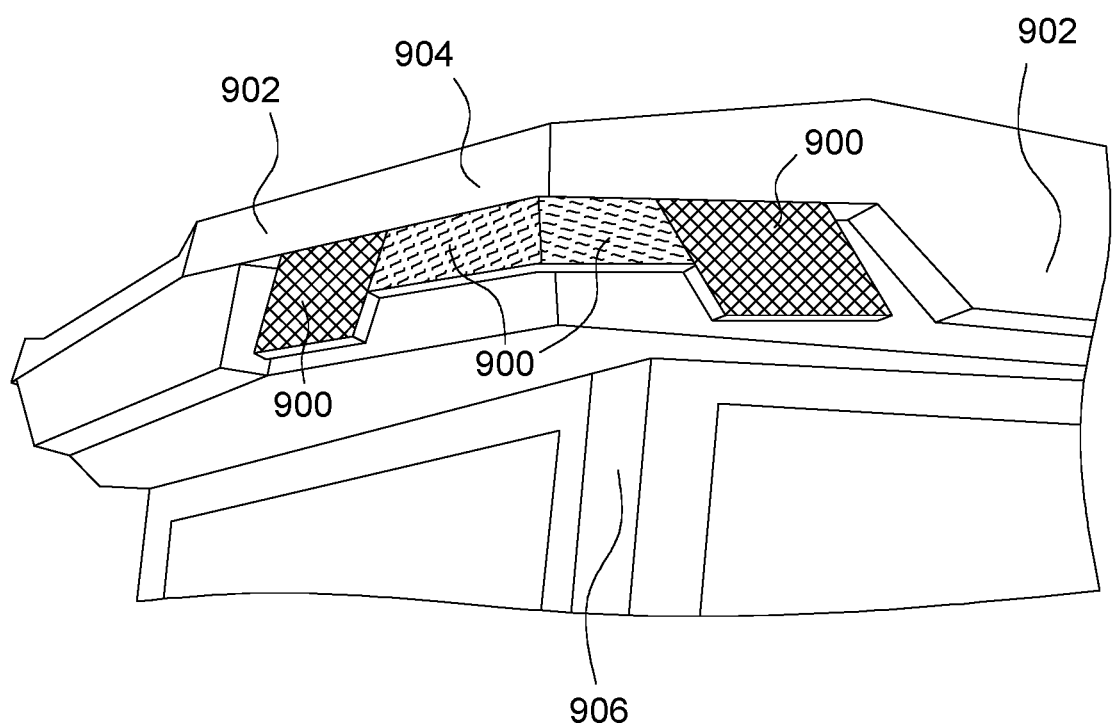
FIG. 9 is a perspective view of a portion of an agricultural vehicle that includes light fixtures integrated into sides of a roof of the agricultural vehicle, according to some implementations of the present disclosure.

In other implementations, additional or fewer light fixtures 106 may be used. Additionally, the light fixtures 106 may have other types of arrangements other than radial. Further, the light fixtures 106 may be non-symmetrical arranged. Still further, although FIG. 1 illustrates the light fixtures 106 as being attached to the roof 104 of the vehicle 100, in other implantations, one or more or all of the light fixtures may be integrated into the vehicle or coupled to other portions of the vehicle 100. For example, FIG. 9 shows light fixtures 900 integrated into sides 902 of a roof 904 of a vehicle 906.

FIG. 2 is a front view of the example light fixture 106. The light fixture 106 includes two rows 200 and 202 of light sources 108. Each row 200 and 202 includes four light sources 108. In other implementations, the light fixture 106 may include a single row of light sources 108 or more than two rows of light sources 108. In still other implementations, a single light fixture may be used. In some implementations, the light sources 108 may be operated independently of each other. In other implementations, two or more of the light sources 108 may be coupled so that the coupled light sources 108 operate in unison.

Figure 3:
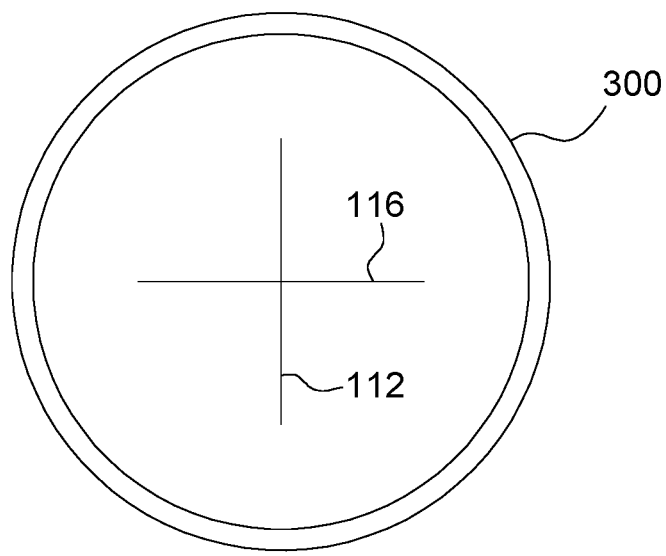
FIGS. 3 and 4 are top and side views, respectively, of an example lighting fixture that contains a plurality of light sources, according to some implementations of the present disclosure.
Figure 4:
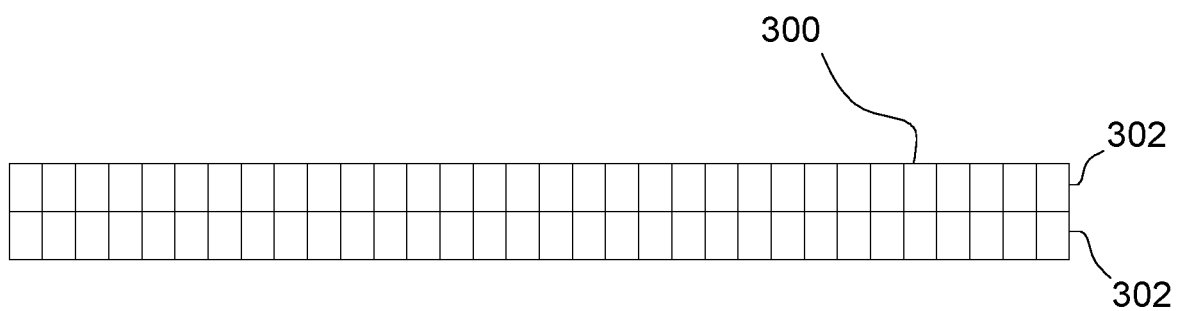

FIGS. 3 and 4 show another example light fixture 300. The light fixture 300 may be a continuous ring that includes a plurality of light sources 302 arranged about the ring. The light sources 302 may be LED. In other implementations, the light sources 302 may be formed of a different type of light technology or may be a mix of different types of light technologies. The light fixture 300 may form a lighting system for providing selective, targeted illumination to an object within an area.

The light sources 302 may be operated independently of each other or in combination as one or more groups. Thus, in some implementations, two or more light sources 302 may be operated together as a group. Further, all of the light sources 302 may be operated together. Although FIG. 4 shows the light fixture 300 as having two rows of light sources 302, in other implementations, the light source 300 may include fewer or additional rows 302.

Figure 5:
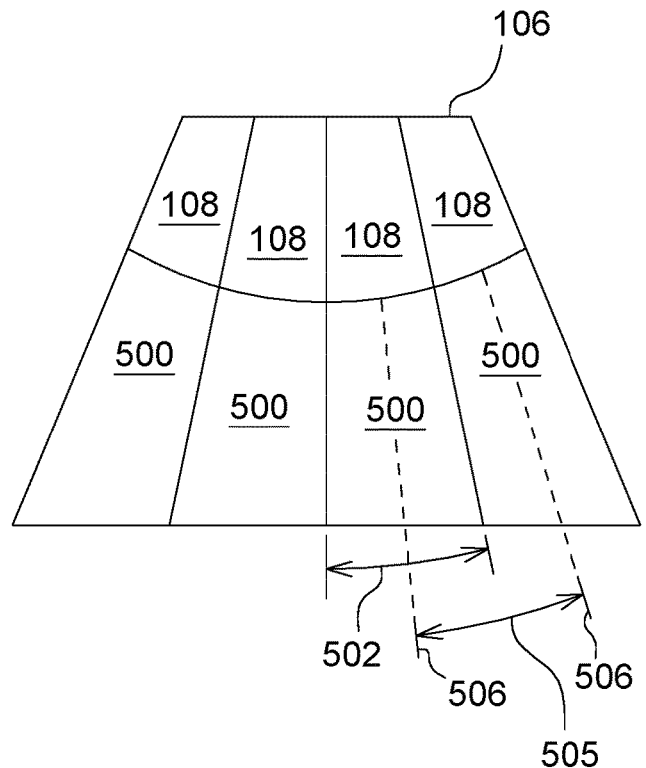
FIG. 5 is a schematic view of a top of another example light fixture, according to some implementations of the present disclosure.

FIG. 5 is a schematic showing a top view of the example light fixture 106, again having four light sources 108 arranged in two vertically adjacent rows. The light fixture 106 is configured such that a light beam 500 produced by each light source 108 is approximately 100 in angular spread. In other implementations, an angular spread 502 of the light beam 500 may be greater than or less than 10°. For example, in some instances, the angular spread of the light beam 500 may be 5°, 10°, 15°, 20°, 25°, 30°, 35°, 40°, or any angle included therein. Further, adjacent light beams 500 may be offset from each other by approximately 10°, as indicated by angle 505. Thus, each of the light beams 500 may be configured to illuminate a different area around the perimeter of the vehicle 100, as shown in FIG. 1. In other implementations, the angular offset 504 between adjacent light beams 500 (measured, for example, between a line 506 bisecting the light beams 500) may be less than 10° or greater than 10°. For example, in some instances, the angular offset between adjacent light beams 500, represented by angle 505, may be 5°, 10°, 15°, 20°, 25°, 30°, 35°, 40°, or any angular value therein. Further, in some implementations, the adjacent light beams 500 may overlap each other. Although FIG. 5 illustrates a single row of light sources 108, the description is applicable for any row included in the light fixture 106.

Figure 26:
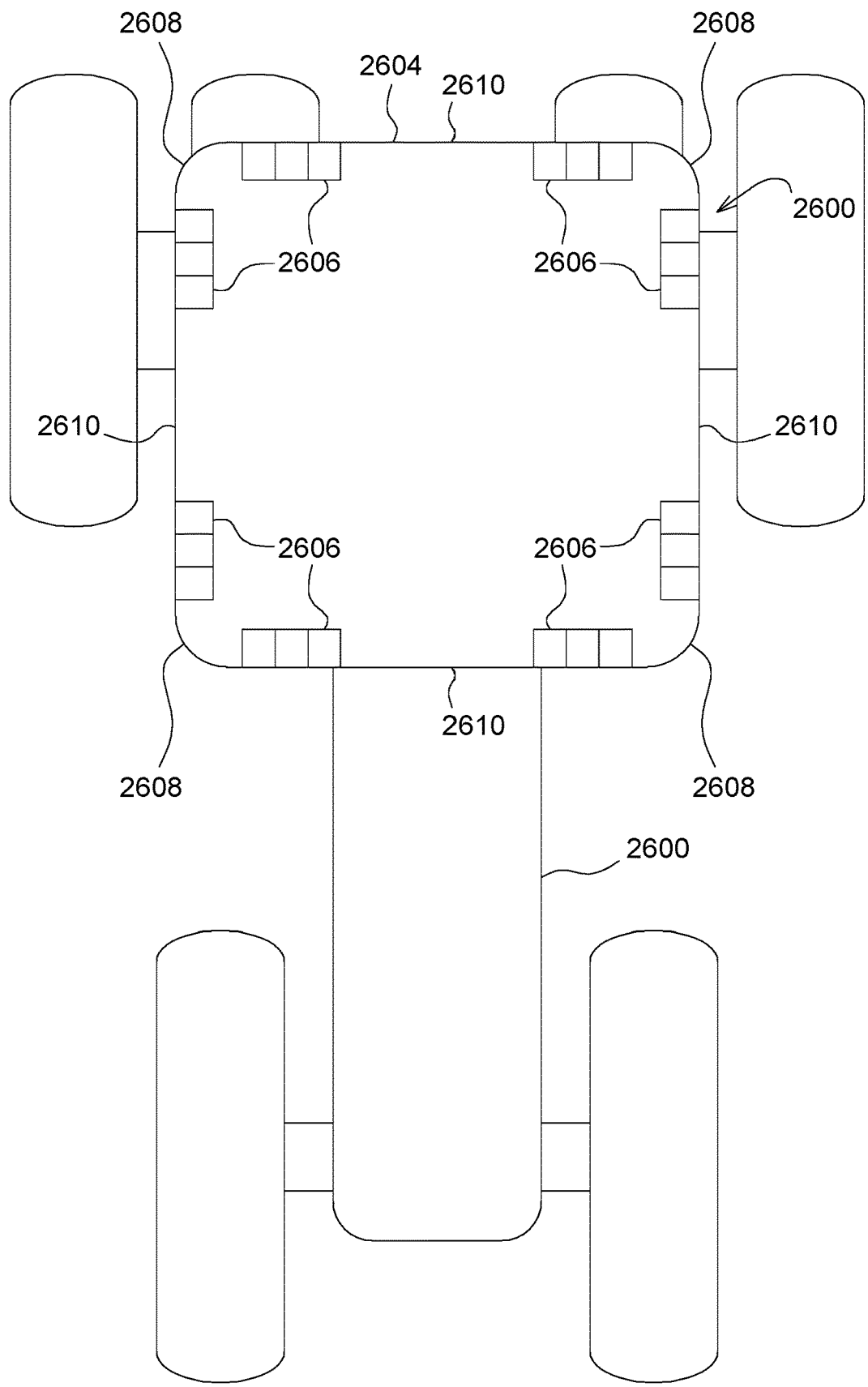
FIG. 26 is a top view of another example vehicle that includes a lighting system in which light sources are integrated into a roof of the vehicle, according to some implementations of the present disclosure.

FIG. 26 is a top view of another example vehicle 2600 that includes another example lighting system 2602. In the illustrated example, light fixtures 2606 are provided on or integrated into a roof 2604 of the vehicle 2600 at corner 2608 of the roof 2604. In some implementations, the light fixtures 2606 may be integrated into the roof 2604 in a manner similar to that shown in FIG. 9. Thus, in the illustrated example, two light fixtures 2606 are provided along each side 2610 of the roof 2604, with each of the light fixtures 2606 disposed at opposing ends of the sides 2610 adjacent to the corners 2608. In other implementations, one or more of the sides may include additional light fixtures 2606. For example, in some implementations, one or more of the sides 2610 may include a light fixture 2606 near a center thereof.

Figure 27:
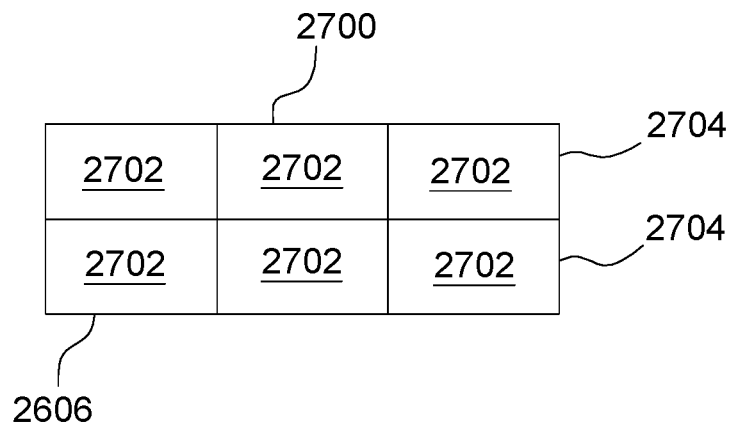
FIGS. 27 and 28 are front views of example light fixtures, according to some implementations of the present disclosure.
Figure 28:
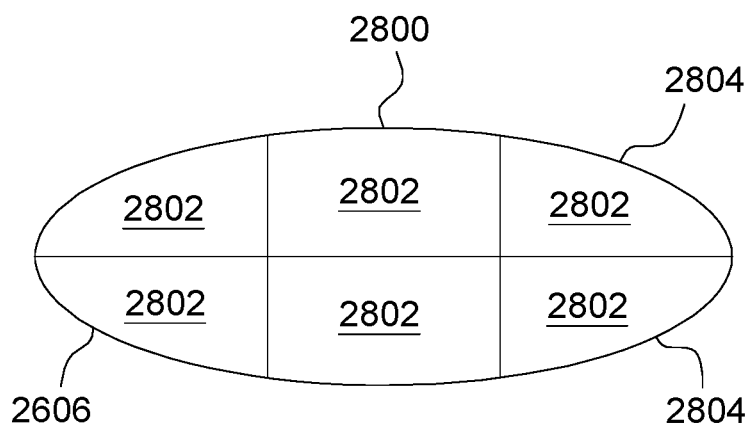

FIGS. 27 and 28 are front views of example light fixtures 2606. In FIG. 27, the light fixture 2606 has a front face 2700 that has rectangular shape. In other implementations, the front face 2700 of the light fixture 2600 may be square or have some other quadrilateral shape. The light fixture 2606 includes six light sources 2702. In other implementations, the light fixture 2606 may include additional or fewer light sources 2702. In some implementations, the light sources 2702 are identical to one another. For example, in some implementations, each of the light sources 2702 may have an identical size and shape. Further, all of the light sources 2702 may be the same type of lighting technology, e.g., LED, incandescent, halogen, fluorescent, sodium-vapor, high-intensity discharge, metal halide, or other types of light technologies. In other implementations, one or more of the light sources 2702 may have a size different from one or more of the other light sources 2702. Further, in some implementations, one or more of the light sources 2702 may use a lighting technology different from one or more of the other light source 2702. The light sources 2702 of the light fixture 2606 are arranged in two horizontal rows 2704 that are vertically stacked.

Figure 8:
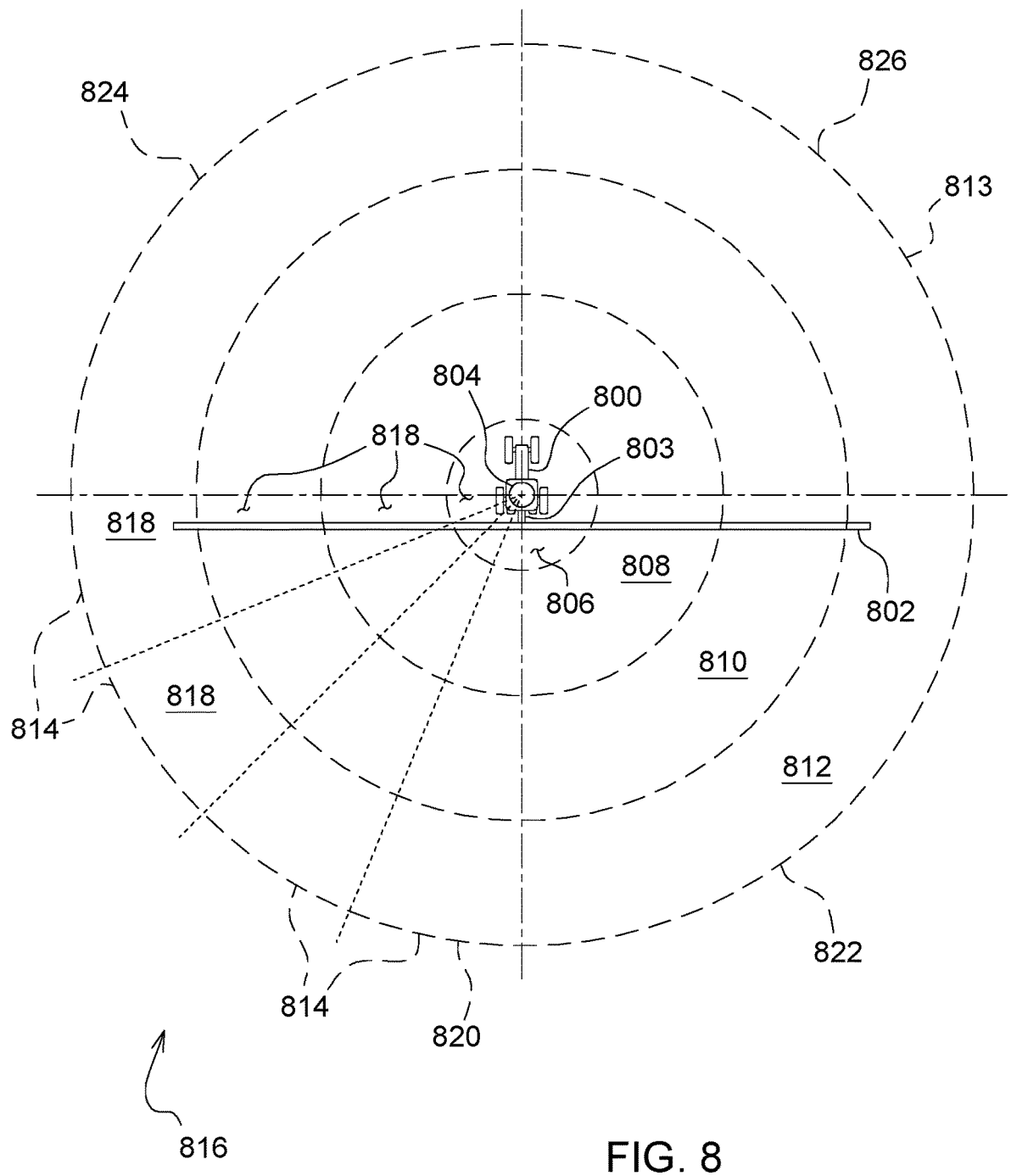
FIG. 8 is a plan view of an agricultural vehicle showing an illumination matrix of discrete areas that can be selectively and separately illuminated by a plurality of light sources, according to some implementations of the present disclosure.

Referring to FIG. 8, the light fixture 2606 has a front face 2800 that has an oval shape. Additionally, the light fixture 2606 of FIG. 8 also includes six light sources 2802. However, in other implementations, the light fixture 2606 may include additional or fewer light sources 2802. Also, the light sources 2802 may be premised on the same lighting technology, or, in other implementations, one or more of the light sources 2802 may be premised on a lighting technology that is different from one or more of the other light sources 2802. The light source 2606 of FIG. 8 also includes two horizontal rows 2804 that are vertically stacked.

Figure 6:
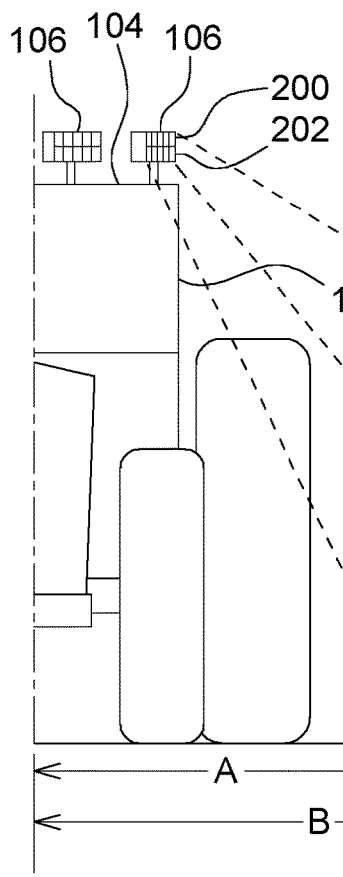
FIG. 6 is a front view of the vehicle shown in FIG. 1, according to some implementations of the present disclosure.
Figure 29:
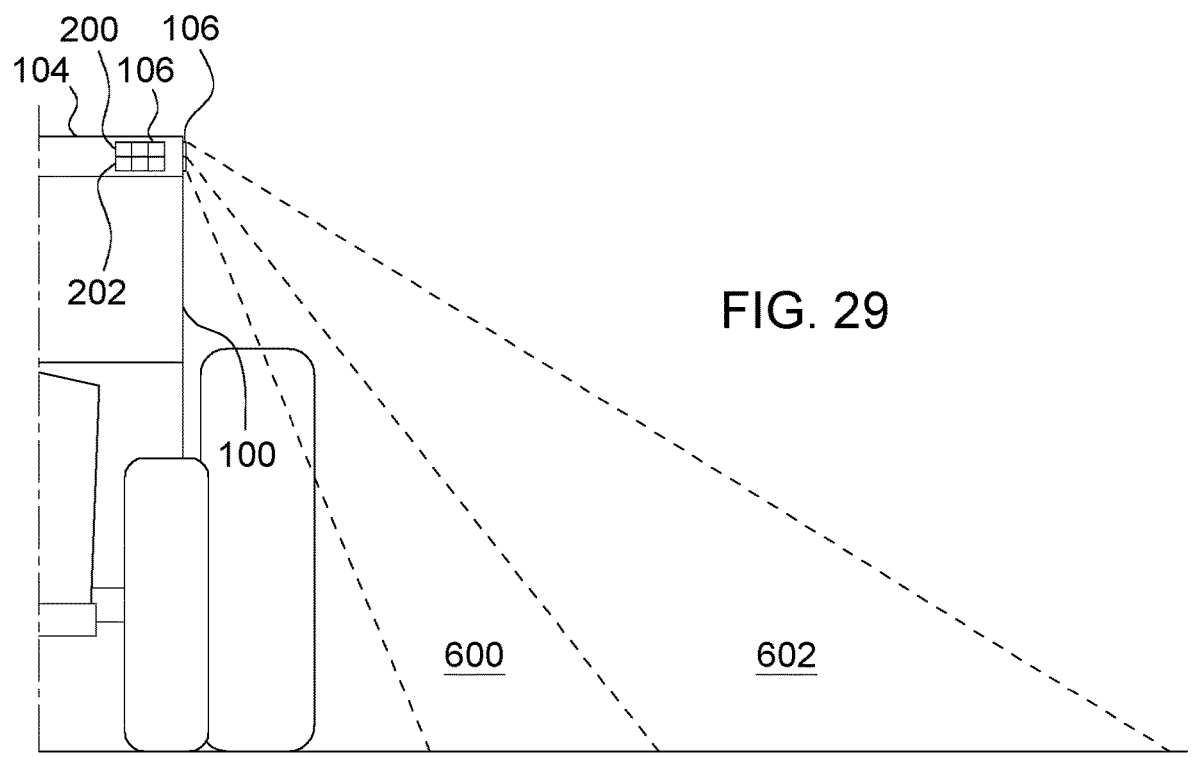
FIG. 29 is a front view of the vehicle shown in FIG. 26, according to some implementations of the present disclosure.
Figure 30:
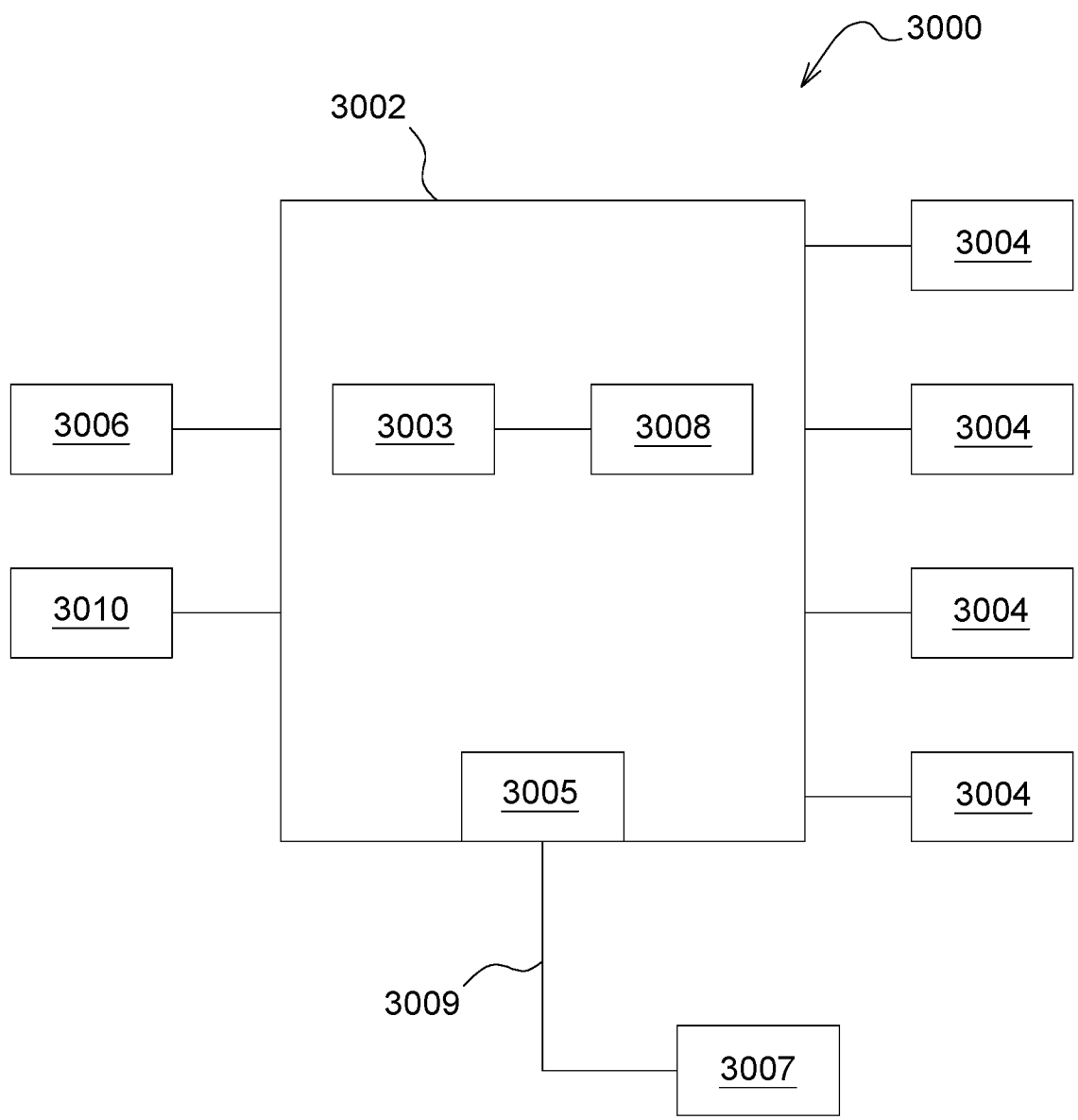
FIG. 30 is a schematic view of an example lighting system, according to some implementations of the present disclosure.

FIG. 6 is a front view of the vehicle 100 shown in FIG. 1. FIG. 6 shows half of the vehicle 100 extending from a vertical plane 600 that contains the longitudinal axis 112. The plane 600 divides the vehicle 100 along the longitudinal center of the vehicle 100. FIG. 6 shows coverage areas illuminated by the different rows of light fixtures 106, such as rows 200 and 202 as shown in FIG. 2. The light fixtures 106 are shown as extending vertically from the roof 104. In other implementations, as described earlier and as shown in FIG. 29, the light fixtures 106 may be integrated into the sides of the roof 104. It is noted that neither FIG. 6 nor any of the other figures of the present disclosure are drawn to scale.

In some implementations, a light beam 600 provided by row 202 of the light fixture 106, which may encompass all or fewer than all of the light sources located within row 202, extends out to approximately 10 meters (m) (32.8 feet (ft)). For example, in some implementations, the light beam 600 may extend from approximately 1.0 m (3.3 ft) to 1.5 m (4.9 ft) (identified as distance A) to 10 m (32.8 ft) (identified as distance B) away from the center plane 600 of the vehicle 100.

A light beam 602 provided by row 200 of the light fixture 106, which may encompass all or fewer than all of the light sources located within row 200, extends away from the vehicle between approximately 10 m (32.8 ft) to approximately 30 m (98.4 ft). In other implementations, the light beam 602 may be provide illumination out to 40 m (131.2 ft) or more. Thus, in some implementations, each light fixture 106 is operable to provide illumination out to approximately 30 meters from the centerline of the vehicle 100.

Although FIG. 6 illustrates that the light beams 600 and 602 as being a combination of the light beams formed by all of the light sources in the respective rows 202 and 200, respectively, it is understood that fewer than all of the light sources in the rows 202 and 200 may be illuminated to provide the respective light beams 600 and 602 that satisfies the illumination described. Further, it is within the scope of the present disclosure that each of the light sources within the rows 202 and 200 provide a light beam that provides illumination having respective dimensions as described above.

In some, implementations, the areas of illumination provided by light beams 600 and 602 may overlap. Further, in some implementations, even though the areas of illumination adjacent to the vehicle 100 defined by the light beams 600 and 602 are not designed to overlap, the illumination provided by the light beams 600 and 602 may overlap as a result of the condition or nature of the light fixtures, atmospheric conditions, or other factors.

Figure 7:
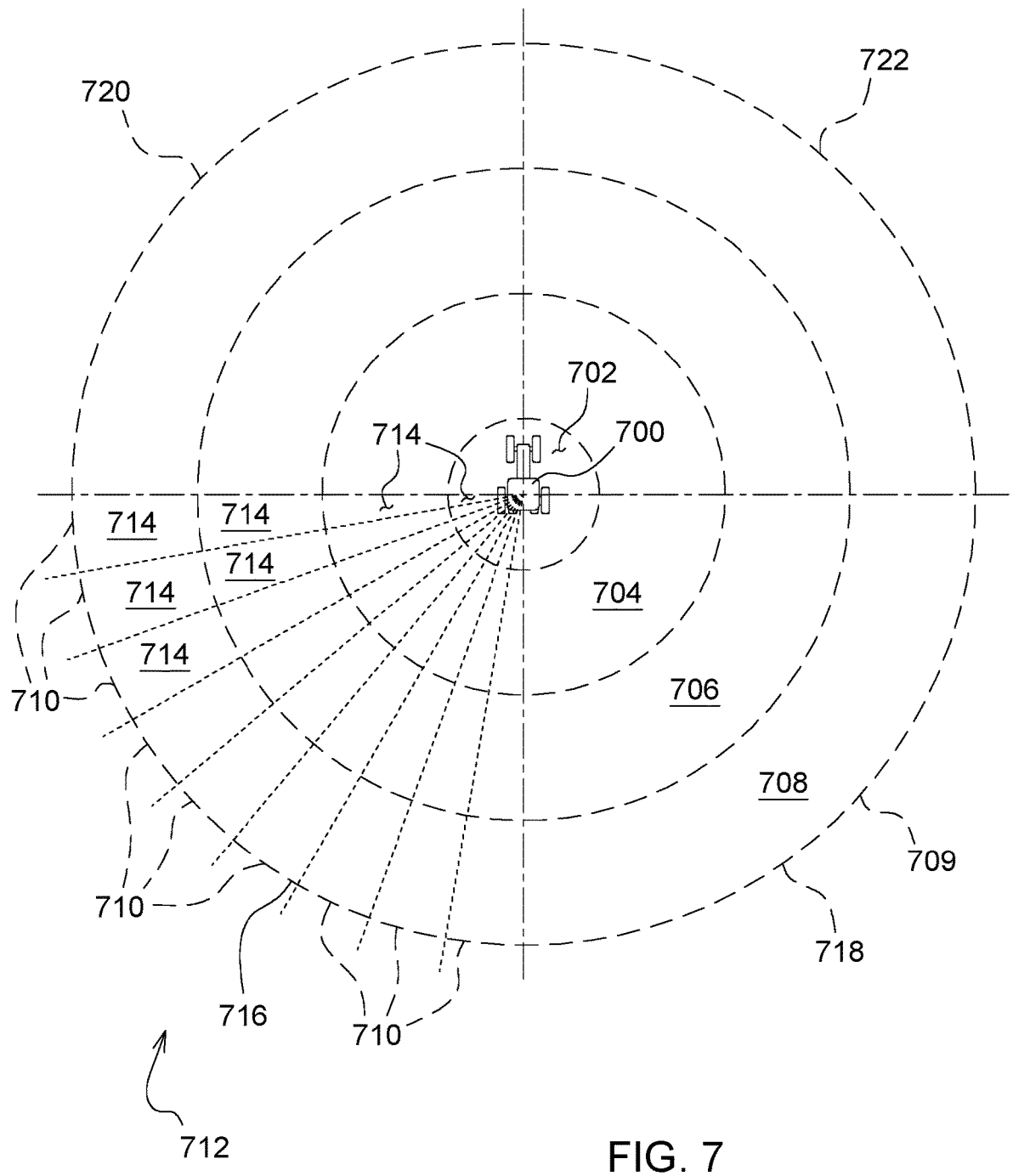
FIG. 7 is a plan view of a vehicle showing an illumination matrix of discrete areas that can be selectively and separately illuminated by a plurality of light sources, according to some implementations of the present disclosure.

Moreover, although the example illustrated in FIG. 6 provides two different zones of illumination formed at different radial bands away from the vehicle, the scope of the present disclosure is not so limited. Rather, in other implementation, more than two different illumination zones may be provided by light fixtures of a lighting system attached to a vehicle. FIG. 7 shows a plan view that illustrates more than two illumination zones circumferentially arranged about a vehicle 700. FIG. 7 shows four illumination zones 702, 704, 706, and 708 that combine to form an illuminated area 709 that radiates from the agricultural vehicle 100. The different zones 702, 704, 706, and 708 form rings around the vehicle 700 having different radial ranges. In other implementations, additional or fewer illumination zones may be produced by a lighting system attached to the vehicle 700.

In some implementations, the different zones may be produced by different rows of light provided in light fixtures included on the vehicle. For example, the light fixture 106 shown in FIG. 2 has two rows of light sources that may operate to produce two different illumination zone. For the four illumination zones shown in FIG. 7, the associated light fixtures may include four different rows of light sources, each row operating to produce a different illumination zone. In other implementations, light fixtures having fewer than four rows or greater than four rows may also be used, and the light sources may be configured and operated to provide a desired number of illumination zones. In other implementations, an illumination zone may be provided by light sources in a portion of a light fixture, e.g., a row, common to light sources used to generate illumination for a different illumination zone.

Still further, FIG. 7 also shows different wedge-shaped regions 710 of angular spread that may be provided by light sources contained within a lighting system used to produce the illumination zones. In the illustrated example, four illumination zones 702, 704, 706, and 708 are provided. Each illumination zone is radially offset from the adjacent illumination zone such that as each illumination zone is activated, an increased amount of the illuminated area 709 is illuminated. The regions 710 combine with the illumination zones 702, 704, 706, and 708 to produce an illumination matrix 712. That is, illumination area 709 is divided up into a matrix 712 of a plurality of discrete areas 714. The discrete areas 714 can be separately illuminated by one or more light sources of a lighting system, such as a lighting system coupled to the vehicle 700. Although the discrete areas 714 are illustrated in a single quadrant 716 of the illuminated area 709, the remaining quadrants 718, 720, and 722 may also be divided up into discrete areas that can be selectively illuminated as described with respect to quadrant 716.

In some implementations, the light sources fully illuminate an implement coupled to the vehicle. The illumination may also provide illumination to an area below the implement, such that the entire area or most of the entire area below the implement is illuminated. Further, the illumination may illuminate an area immediately adjacent to the implement.

The number of illumination zones produced and the distance away from a vehicle to which illumination is provided may be selected based on the number and types of implements to be used by the vehicle and, in some instances, a distance to be illuminated beyond the outer extents of the implements. FIG. 8 shows an agricultural vehicle 800, which may be a tractor, and an agricultural implement 802, which may be, for example, a seeder or a sprayer. The agricultural implement 802 is coupled to the agricultural vehicle 800 with an implement connector 803. In the illustrated implementation, a lighting system 804 included with the agricultural vehicle 800 may be operable to create four illumination zones 806, 808, 810, and 812 that may be operated independently of each other. The illumination zones 806, 808, 810, and 812 combine to form an illuminated area 813. Each of the illumination zones 806, 808, 810, and 812 forms a generally annular shape. In other implementations, shapes of the illumination zones 806, 808, 810, and 812 may be other than annular. Although four illumination zones are illustrated, in other implementations, additional or fewer illumination zones may be generated.

As shown, a first zone 806 is formed around an area immediately adjacent to the agricultural vehicle 800. A second zone 808 is disposed adjacent to the first zone 806 and extends to an outer, third zone 810. An outermost fourth zone 812 extends beyond the outer zone 810. As explained earlier, each of the illumination zones may be produced by a dedicated row of lights on a light fixture. In some implementations, the different rows may be vertically stacked. However, in other implementations, the light sources used to generate the different zones may have other arrangements. For example, in some implementations, light sources provided in a light fixture to form a zone of illumination may be interdispersed with light sources used to form another illumination zone. For example, in some instances, light sources to produced different light zone may be provided in a common row of light sources. Although four illumination zones are provided in the example illustrated implementation, additional illumination zones may be provided. Further, the radial extent of the different zones 806, 808, 810, and 812 may be selected to be any desired size. Still further, one or more portions of each of the different illumination zones may be selectively illuminated while one or more other portions may remain unilluminated.

In some implementations, the first zone 806 may provide illumination to an area immediately adjacent to the agricultural vehicle 800. The second illumination zone 808 may provide an intermediate illumination zone that illuminates an intermediate part of a particular implement. For a different implement having a reduced size, the second illumination zone 808 may provide illumination to an outermost extent of the implement. Thus, the number of the illumination zones or portions of those illumination zones that are activated may depend upon an extent of the implement 802 coupled to the agricultural vehicle 800. For implements 802 having a reduced lateral extent, a reduced number of illumination zones or portion(s) of those illumination zones may be generated. In the illustrated example, the radially outermost illumination zone 812 provides illumination beyond the lateral extent of the implement 802.

Similar to the illumination area 709, in addition to the different zones 806, 808, 810, and 812, the illuminated area 813 also includes wedge-shaped regions 814 that combine with the different zones 806, 808, 810, and 812 to form a matrix 816 of individual discrete areas 818. One or more light sources of the lighting system 804 may be used to illuminate each of the discrete areas 818. Further, although a single quadrant 820 in FIG. 8 is shown as being divided into the discrete areas 818, the other quadrants 822, 824, and 826 may also be divided into discrete areas that are able to be illuminated individually.

Providing different illumination zones allows an operator of the agricultural vehicle 800 to selectively use an amount of illumination that is, for example, tailored to the vehicle arrangement, e.g., a size of the implement; an amount of area beyond the implement 802 for which illumination is desired; and other desires of the operator of the agricultural vehicle 800.

Figure 10:
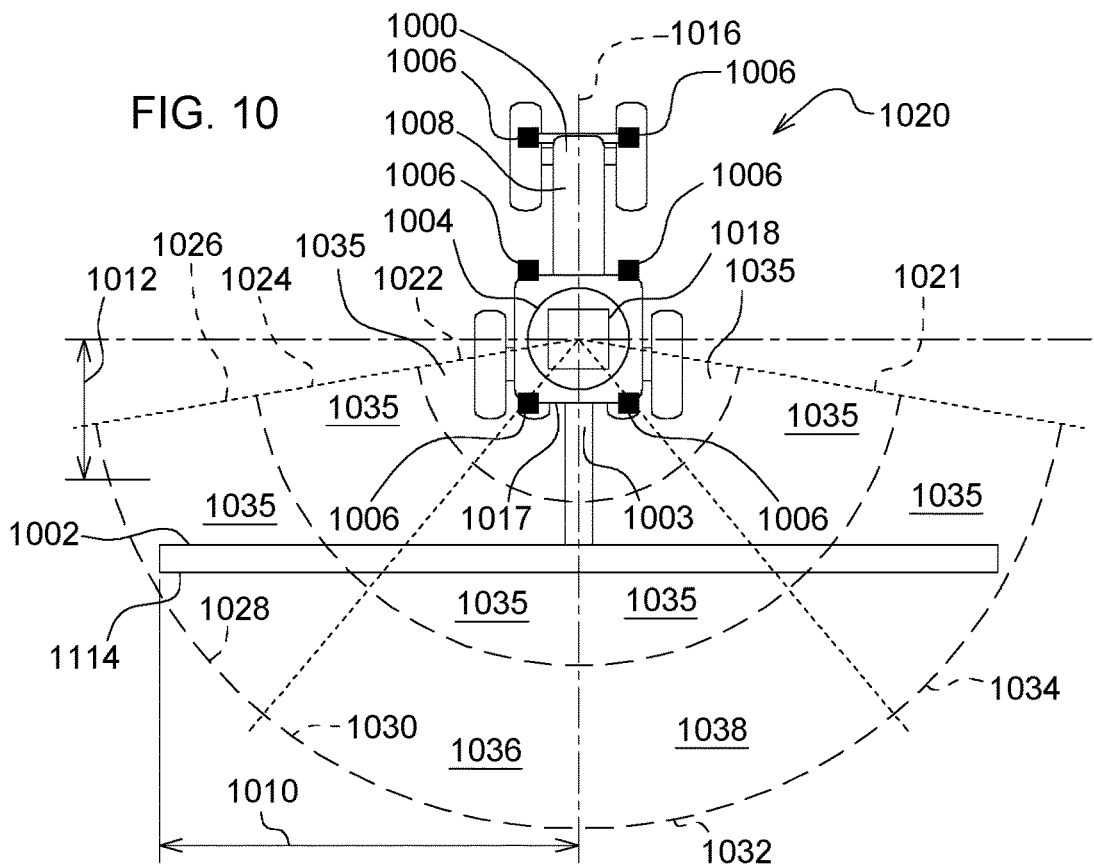
FIG. 10 is a plan view of an example agricultural vehicle and an implement coupled to the agricultural vehicle with an illumination area that encompasses the implement, according to some implementations of the present disclosure.

Lighting systems as described herein may be incorporated into an illumination control system that automatically detects an implement and provides targeted illumination to the detected implement. FIG. 10 is a plan view of an agricultural vehicle 1000 and an implement 1002 coupled to the agricultural vehicle 1000 with an implement coupler 1003. The agricultural vehicle 1000 includes a includes lighting system 1004 and a plurality of sensors 1006. In the illustrated example, six sensors 1006 are provided along a perimeter 1008 of the agricultural vehicle 1000. In other implementations, additional or fewer sensors 1006 may be used. Further, placement of the sensors 1006 may be provided at any desired location. Particularly, the sensors 1006 may be positioned on the agricultural vehicle 1000 at positions that allow the sensors 1006 to detect a position of the implement 1002 and an extent to which the implement extends from the agricultural vehicle 1000, such as a lateral extent 1010 to which the implement 1002 extends from the agricultural vehicle 1000 and a longitudinal extent 1012 that the implement 1002 extends from the agricultural vehicle 1000. In the illustrated example, the lateral extent 1010 is an amount by which a lateral end 1014 of the implement 1002 extends from a centerline 1016 of the agricultural vehicle 1000, and the longitudinal extent 1010 is a longitudinal distance (measured parallel to the centerline 1016) that the implement 1002 extends from an end 1017 of the agricultural vehicle 1000.

The sensors 1006 may include one or more cameras, lasers (e.g., infrared lasers), light sensors (e.g., an infrared sensor), lidars, or other sensors operable to detect the presence of an implement. The sensors 1006 may also include a light intensity (brightness) sensor to detect an intensity of light at a selected position relative to the agricultural vehicle 1000. The sensors 1006 are operable to detect a condition of an area adjacent to the sensor, such as a lighting condition or a visual condition. The sensed condition is subsequently used to determine whether an object, such as an implement, is present in the area being sensed. The lighting system 1004 and sensors 1006 are coupled to a controller 1018 to form an illumination control system 1020. Although the implementation illustrated in FIG. 10 shows the controller 1018 as being included with the agricultural vehicle 1000, in other implementations, the controller may be remotely located and communicably coupled to the lighting system 1004, sensors 1006, or both via a wireless connection. The controller 1018 is operable to receive inputs from the sensors 1006, process the received data to detect an implement and determine the lateral and longitudinal extents 1010 and 1012 of the detected implement, and activate light sources of the lighting system 1004 to provide a desired amount of illumination, such as full illumination, of the detected implement 1002, as described in more detail below.

The illumination control system 1020 utilizes the sensors 1006 to detect the presence of the implement 1002 and the lateral and longitudinal extents 1010 and 1012 of the implement 1002. In response, the controller 1018 selectively operates one or more light sources contained in the lighting system 1004 to provide selective illumination of the implement 1002. In the illustrated example, light sources of the lighting system 1004 are activated to produce an illuminated area 1021 that encompasses the implement 1002. The illuminated area 1021 includes a portion of three illumination zones 1022, 1024, and 1026. Additionally, the angular extent of the illumination is illustrated as four regions 1028, 1030, 1032, and 1034. In the illustrated example, each of the four regions 1028, 1030, 1032, and 1034 has the same angular range of illumination. In some implementations, the angular spread of the four regions 1028, 1030, 1032, and 1034 may be ten degrees. However, as explained above, the angular spread may be selected to be any desired value. In some implementations, illumination for each of the regions 1028, 1030, 1032, and 1034 may be provided by a group of light sources. For example, individual light sources may be used to illuminate discrete areas 1035 within each of the different illumination zones 1022, 1024, and 1026 within the illuminated area 1021. In the illustrated example, separate light sources may be used to illuminate each of the three discrete areas contained within the region 1028. In other implementations, more than one light source may be used to illuminate each of the discreate areas 1035.

As shown in FIG. 10, illumination of the regions 1028, 1030, 1032, and 1034 across the illumination zones 1022, 1024, and 1026 provides full illumination of the implement 102 (including some illumination laterally and longitudinally beyond the implement 1002) while avoiding illumination to other areas around the agricultural vehicle 1000. By using selective illumination, excessive lighting is avoided, which, among other things, reduces or eliminates glare from and shadow lines produced by the implement 1002. It is also noted that, although shown as being illuminated in FIG. 9, the discrete areas 1036 and 1038 located in the regions 1030 and 1032, respectively, within the illumination zone 1026 may be deactivated, since the illumination provided in these regions are beyond and not needed to illuminate the implement 1002. Still further, in some instances, illumination provided to the four discrete areas 1035 of the illumination zone 1022 within the illumination area 1021 may also be eliminated, since no part of the implement is present in this area. Still further, the two center discrete areas 1035 within the illumination zone 1022 may be provide in order to illuminate the implement coupler 1003.

In the illustrated example, the illumination zones 1022, 1024, and 1026 have an annular shape that form discrete rings or portions of rings about the agricultural vehicle 1000, and the regions 1028, 1030, 1032, and 1034 extend radially across the illumination zones 1022, 1024, and 1026. In the illustrated example, the regions 1028, 1030, 1032, and 1034 form generally wedge-shaped portions that extends over an angular range. In combination, the illumination zones 1022, 1024, and 1026 and regions 1028, 1030, 1032, and 1034 form the illumination area 1021 that extends from the agricultural vehicle 1000 to provide full illumination of the implement 1002. It is noted that the illustrated illumination region 1021 forms a portion of a larger area encircling the agricultural vehicle 1000 that may be illuminated by the lighting system 1004, as shown, for example, in FIGS. 7 and 8.

As light sources associated with the different illumination zones 1028, 1030, 1032, and 1034 and regions 1022, 1024, and 1026 are activated and deactivated, an amount of illumination applied to an area surrounding the agricultural vehicle 1000 and implement 1002 may be selectively changed to place illumination at locations where illumination is desired, such as to provide full illumination of the implement 1002, selective illumination to other areas around the agricultural vehicle 1000, or both.

Figure 11:
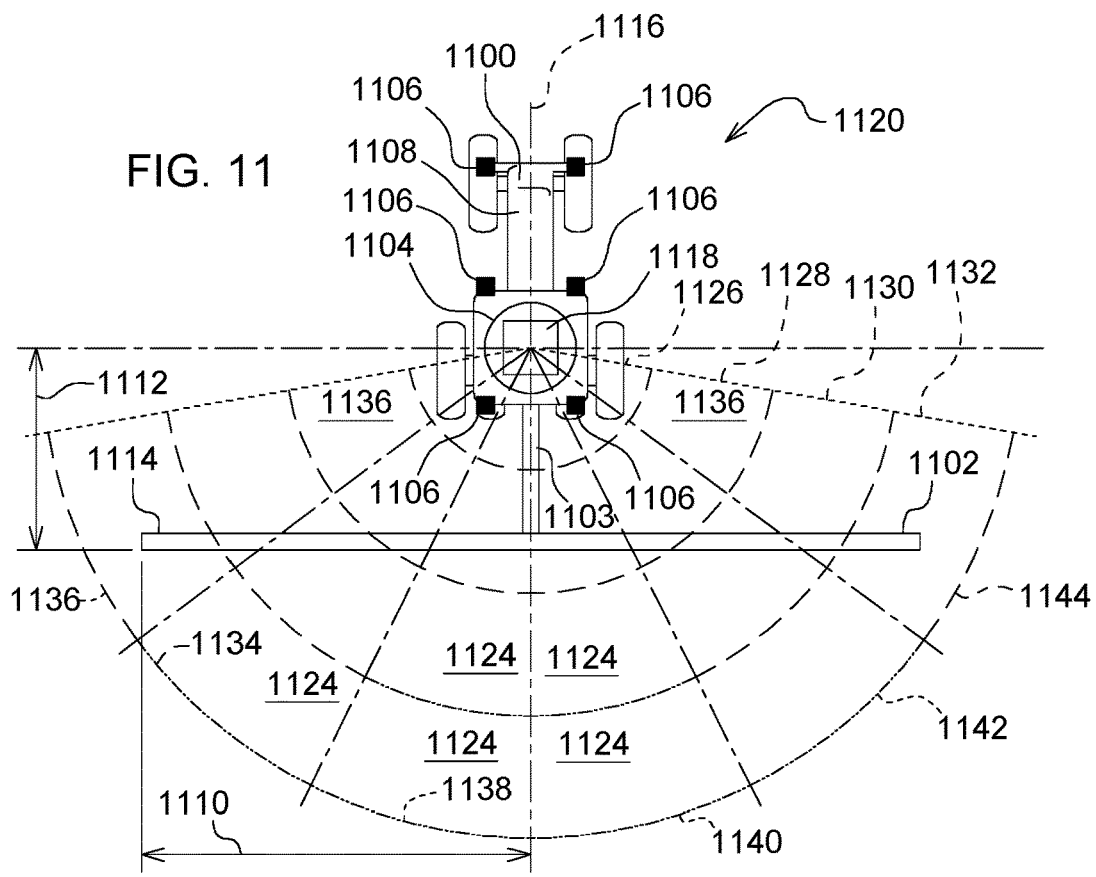
FIG. 11 is a plan view of another example agricultural vehicle and an implement coupled to the agricultural vehicle with an illumination area that encompasses the implement, according to some implementations of the present disclosure.

FIG. 11 is a plan view of another agricultural vehicle 1100 with an implement 1102 coupled to the agricultural vehicle 1100. The implement 1102 is coupled to the agricultural vehicle 1100 with an implement coupler 1103. In this example, a width of the implement 1102 is greater than the width of the implement 1002 shown in the example of FIG. 10. With the increased width, a greater amount of illumination is produced by a lighting system 1104 of the agricultural vehicle 1100 to fully illuminate the implement 1102. The agricultural vehicle 1100 also includes a plurality of sensors 1106. The sensors 1106 may be similar to the sensors 1006 described earlier. Additionally, the sensors 1106 are operable to detect a position of the implement 1102. In the illustrated example, the sensors 1106 are located along a perimeter 1108 of the agricultural vehicle 1100. However, the sensors 1106 may be positioned on the agricultural vehicle 1100 at positions that allow the sensors 1106 to detect a position of the implement 1102 and an extent to which the implement extends from the agricultural vehicle 1100, such as a lateral extent 1110 to which the implement 1102 extends from the agricultural vehicle 1100 and a longitudinal extent 1112 that the implement 1102 extends from the agricultural vehicle 1100. The lateral extent 1110 and the longitudinal extent 1112 are measured similar to the lateral extent 1010 and the longitudinal extent 1012 described earlier. A centerline 1116 extends longitudinally through the agricultural vehicle 1100 and implement 1102.

The agricultural vehicle 1100 also includes a controller 1118. The lighting system 1104 and sensors 1106 are coupled to a controller 1118 to form an illumination control system 1120. Similar to the implementation of FIG. 10, the controller 1118 may be located on the agricultural vehicle 1100, or the controller 1118 may be remotely located from the agricultural vehicle 1100 and coupled to the lighting system 1104, the sensors 1106, or both via a wireless connection. The controller 1118 is operable to receive inputs from the sensors 1106, process the received data to detect the presence of an implement, determine the lateral and longitudinal extents 1110 and 1112, and activate light sources of the lighting system 1104 to provide a desired amount of illumination, such as full illumination of the implement 1102, as described in more detail below. Thus, the illumination control system 1120 is operable to detect the presence and configuration (e.g., size and position) of the implement 1102. In response, the controller 1118 selectively operates one or more light sources contained in the lighting system 1004 to provide selective illumination of the implement 1002.

Similar to FIG. 10, the lighting system 1104 of FIG. 11 provides an illuminated region 1122 that is formed of a plurality of discrete areas, such as discrete areas 1124, formed by the intersection of illumination zones 1126, 1128, 1130, and 1132 that form annular rings around the agricultural vehicle 1100 and regions 1134 through 1144 that form wedge-shaped portions that extend radially outwardly from the agricultural vehicle. In the illustrated example, the regions 1134 through 1144 have a uniform angular distribution. In other implementations, the angular distribution may be nonuniform. Further, in other implementation, additional for fewer regions may be formed. Still further, the illuminated region 1122 may form part of a larger area encircling the agricultural vehicle 1100 that may be illuminated by the lighting system 1104, as shown, for example, in FIGS. 7 and 8.

Returning again to FIG. 11, the lateral extent 1110 of the implement 1102 is greater than the lateral extent 1010 of the implement 1002 of FIG. 10. Additional light sources contained in the lighting system 1104 are utilized to fully illuminate the implement 1102. Particularly, three regions on each side of the centerline 1116 are utilized to illuminate the entire lateral extent 1110. Further, the implement 1102 may extend longitudinally farther from the agricultural vehicle 1100, which results in portions of additional illumination zones to be illuminated to fully illuminate the implement 1102. As shown in FIG. 10, portions of three illumination zones 1022, 1024, and 1026 are utilized to fully illuminate the implement 1002. In contrast, as shown in FIG. 11, portions of four illuminations zones 1126, 1128, 1130, and 1132 are illuminated in order to fully illuminate the implement 1102.

It is also noted that portions of some of the regions within the illuminations zones beyond the implement 1102 are not illuminated. Particularly, the discrete areas 1124 that are located longitudinally beyond the implement 1102 are not illuminated. As a result, a reduced amount of light is generated, resulting in a reduced amount of power used by the lighting system 1104 and reducing an amount of glare that may be reflected back to the operator of the agricultural vehicle 1100. Still further, illumination of discrete areas 1136 and all of the discrete areas within the illumination zone 1126 may be prevented, since no portion of the implement 1102 is present in those regions. Alternatively, the two central discrete areas of the illumination zone 1126 may be illuminated in order to provide illumination of the implement coupler 1103

Thus, FIGS. 10 and 11 illustrate that lighting systems may be selectively operated to provide an amount of illumination, for example, to fully illuminate an implement, while avoiding areas beyond the implement or not otherwise occupied by the implement, thereby reducing a total amount of light projected into an area. As a result, glare experienced by the operator is reduced.

The lighting systems 1004 and 1104 shown in FIGS. 10 and 11, respectively, may also provide light having increased brightness levels at the lateral ends of the implements 1002 and 1102, respectively while decreased light levels are provided to areas of the implements 1002 and 1102 between the lateral ends and closer to the agricultural vehicle 1000 and 1100, respectively.

Figure 12:
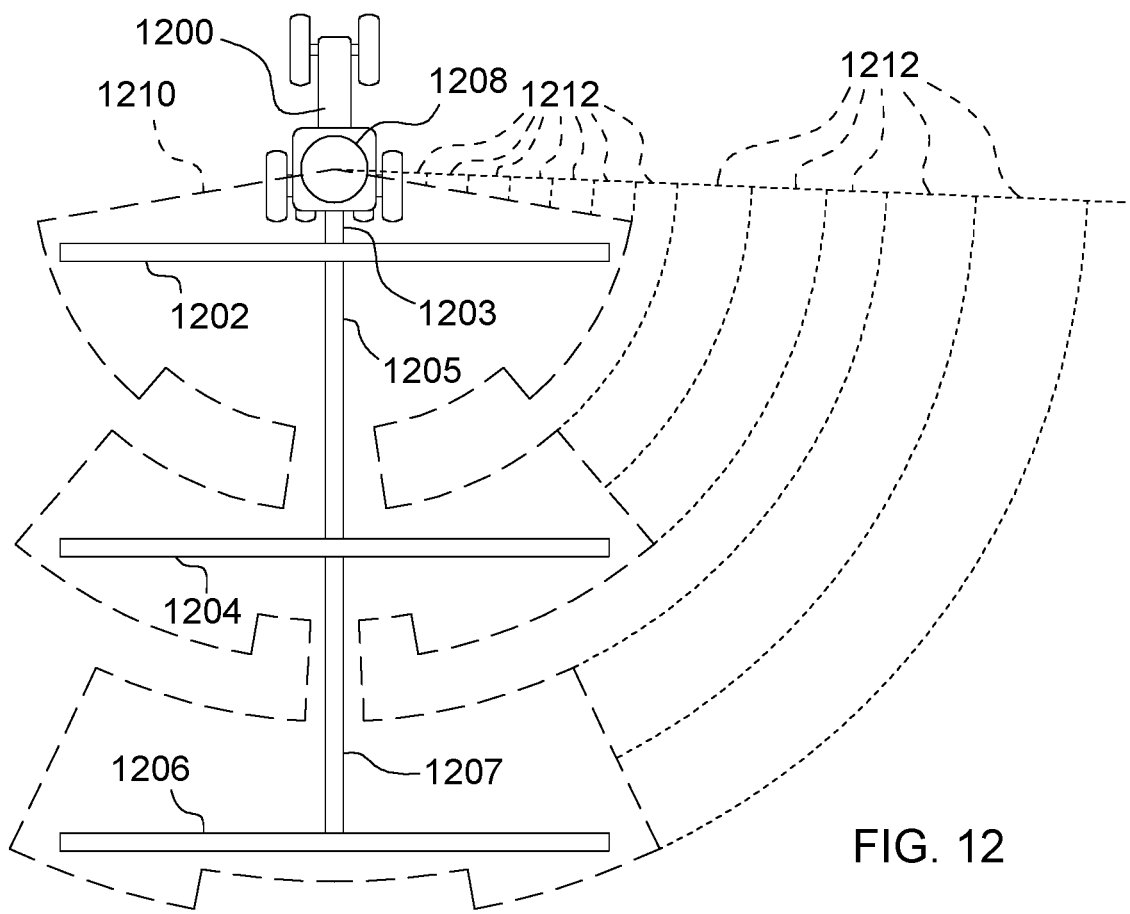
FIG. 12 is a plan view of another example agricultural vehicle to which several implements are coupled to form a train arrangement, according to some implementations of the present disclosure.

FIG. 12 is a plan view of another agricultural vehicle 1200 to which implements 1202, 1204, and 1206 are coupled to form a train arrangement. Implement couplers 1203, 1205, and 1207 are used to couple the implements into the train arrangement. A lighting system 1208 of the agricultural vehicle 1200 generates an illuminated area 1210 that is formed of discrete areas of illumination within a matrix formed by a plurality of annular illumination zones 1212 and radially extending regions (not specifically identified but similar to the regions illustrated in FIGS. 7 and 8) to provide light to fully illuminate the implements 1202, 1204, and 1206 while avoiding illumination of areas through which none of the implements 1202, 1204, and 1206 extend. In the illustrated example, each of the implement couplers 1203, 1205, and 1207 are also illuminated. In other implementations, illumination of the implement couplers 1203, 1205, and 1207 may be eliminated.

Figure 13:
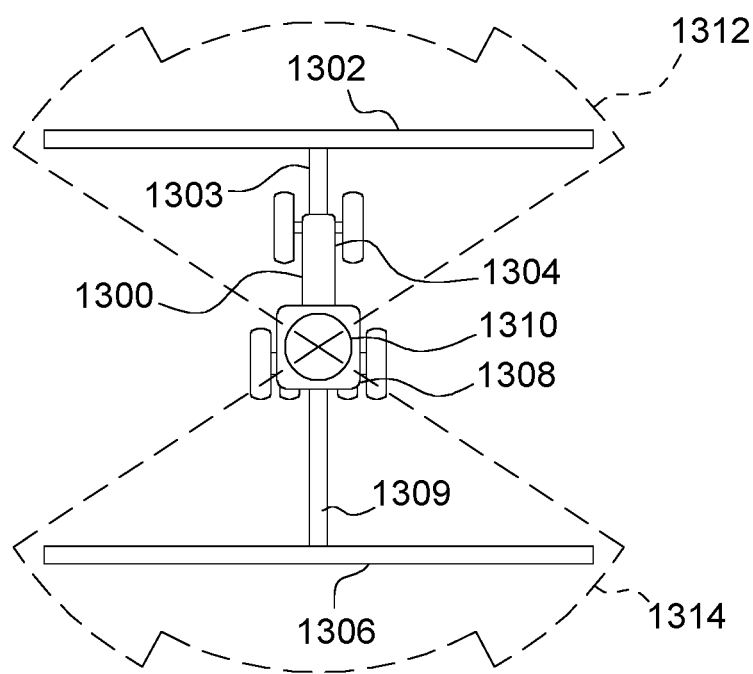
FIG. 13 is a plan view of another example agricultural vehicle having a first implement coupled to a first end of the agricultural vehicle and a second implement coupled to a second end of the agricultural vehicle, according to some implementations of the present disclosure.

FIG. 13 shows another example in which an agricultural vehicle 1300 includes a first implement 1302 coupled at a front end 1304 of the agricultural vehicle 1300 and a second implement 1306 coupled at a back end 1308 of the agricultural vehicle 1300 The first implement 1302 and the second implement 1306 are coupled to the agricultural vehicle 1300 with implement couplers 1303 and 1309, respectively. A lighting system 1310 of the agricultural vehicle 1300 is operable to generate a first illuminated area 1312 that fully illuminates the first implement 1302 while avoiding illuminating areas beyond the first implement 1302 and a second illuminated area 1314 that fully encompasses the second implement 1306 while avoiding illuminating areas beyond the second implement 1306, according to the principles described herein.

Although an implement extending from a front end and a back end of an agricultural vehicle are shown in FIG. 13, the present disclosure encompasses arrangements in which one or more implements coupled to and extending from the front end without an implement coupled to the back end of the agricultural vehicle. Further, the present disclosure also encompasses arrangements in which a plurality of implements are coupled to a front end of an agricultural vehicle and a plurality of implements are coupled to a back end of the agricultural vehicle.

Figure 14:
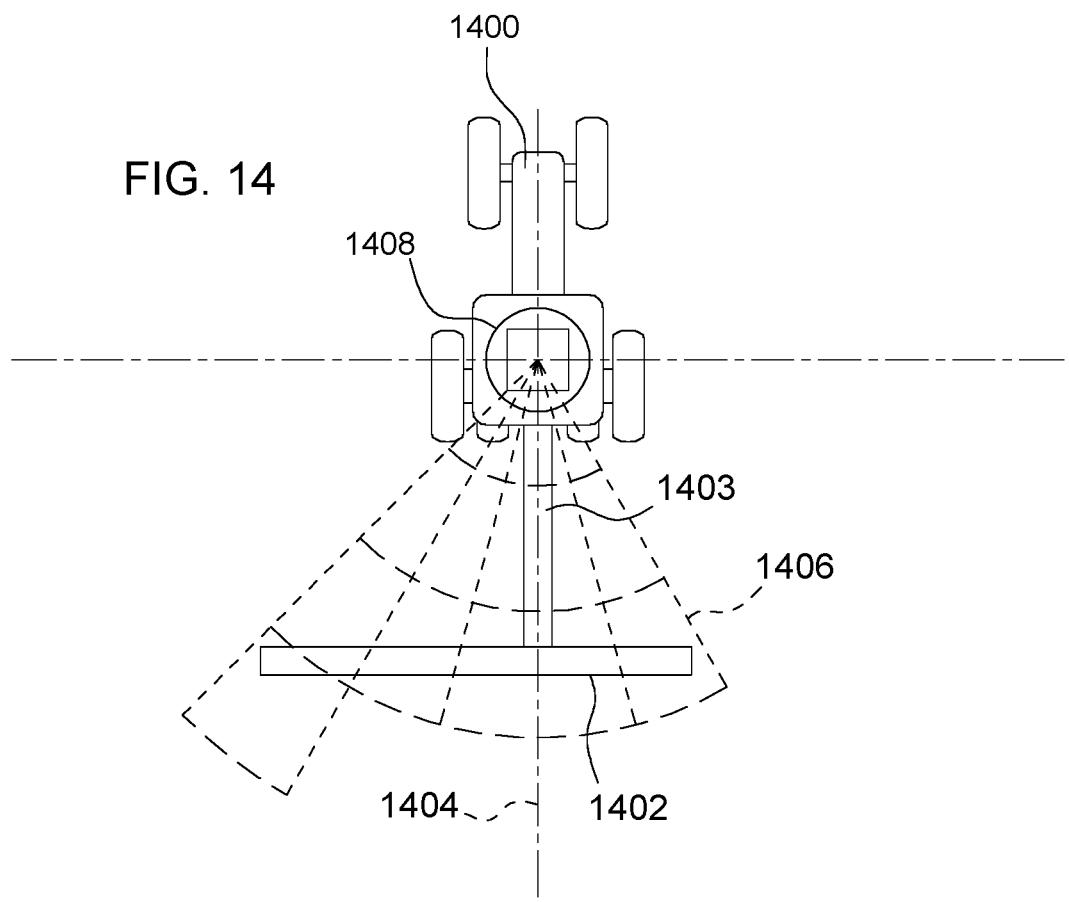
FIG. 14 is a plan view showing another example agricultural vehicle with a coupled implement that is laterally asymmetrically disposed relative to a centerline of the agricultural vehicle, according to some implementations of the present disclosure.

Also, various implementations have been provided in which implements are symmetrically arranged about a centerline of an agricultural vehicle. However, the scope of the present disclosure encompasses arrangements in which one or more implements are arranged asymmetrically relative to an agricultural vehicle, such as asymmetrical relative to a centerline of the agricultural vehicle. FIG. 14 is a plan view showing an agricultural vehicle 1400 with a coupled implement 1402 that is laterally asymmetrically disposed relative to a centerline 1404. An implement coupler 1403 is used to connect the implement 1402 to the agricultural vehicle 1400. An illuminated area 1406 generated by a lighting system 1408 according to the principles of the present disclosure is similarly asymmetrical to conform with the size and position of the implement.

Figure 15:
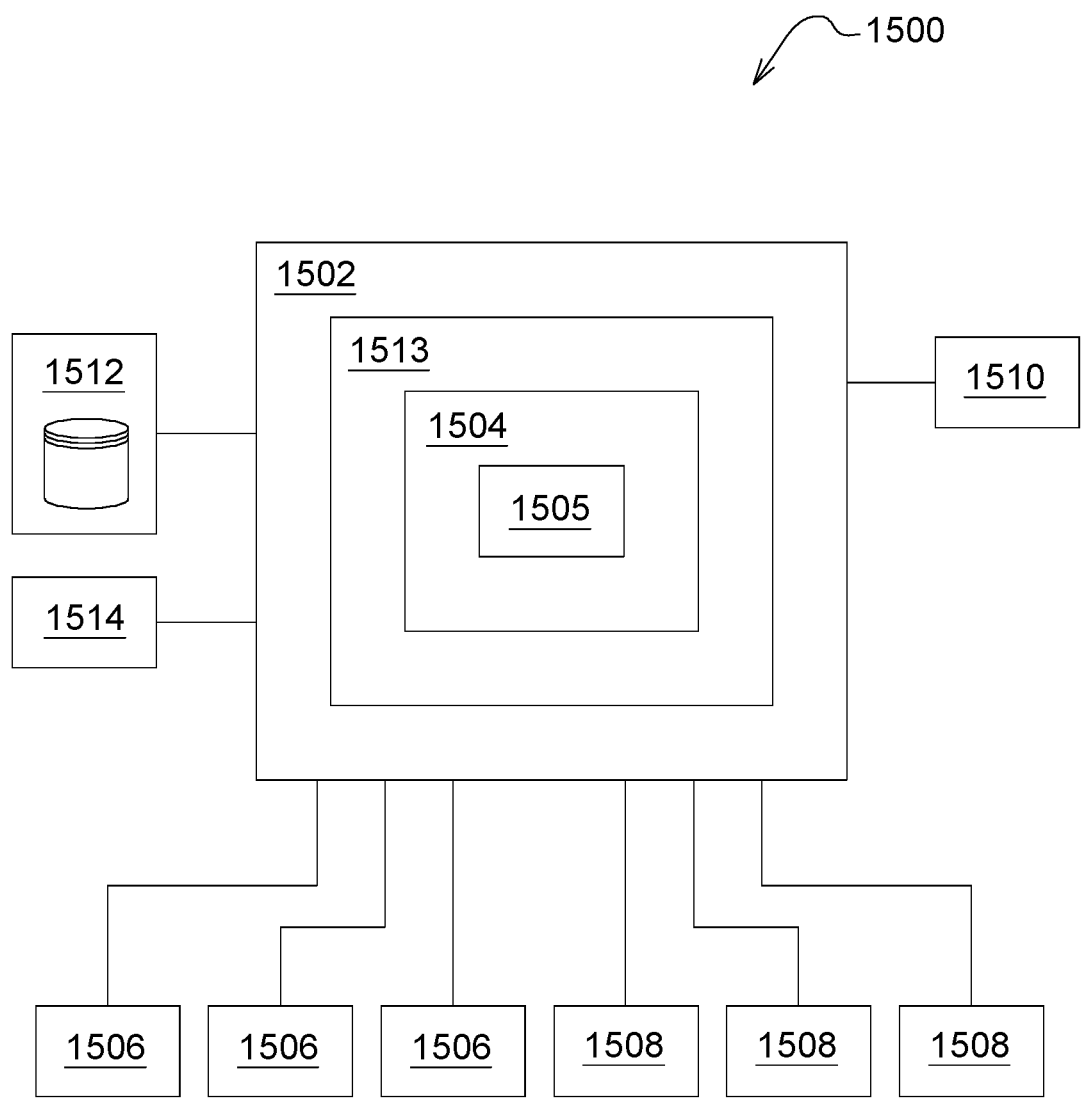
FIG. 15 is a schematic of an example illumination control system to provide targeted illumination, according to some implementations of the present disclosure.

FIG. 15 is a schematic of an example illumination control system 1500 to provide targeted illumination. Particularly, the system 1500 is operable to detect the presence of one or more implements coupled to a vehicle, such as an agricultural vehicle; determine an extent and position of a detected implement; and provide targeted illumination to that fully illuminates the implement while avoiding the production of light that would otherwise not provide illuminating of the implement. Further, in some implementations, the system 1500 is operable to alter a brightness of the light based on an extent to which the implement extends from the vehicle.

The system 1500 includes a controller 1502, and the controller 1502 includes an agent 1504. The agent 1504 includes a machine learning model 1505. Sensors 1506 are communicably coupled to the controller 1502. The sensors 1506 may be communicably coupled via a wired or wireless connection. Although three sensors 1506 are shown in FIG. 15, additional or fewer sensors may be used. The sensors 1506 may include one more cameras, lasers, light detectors, lidars, or other sensors. The sensors 1506 provide sensory data to the agent 1504 that the agent 1504 uses to detect an implement, such as the presence, position, and size of an implement. Generally, the agent 1504 is any program, software, or application that can receive sensory data from sensors 1506 and generate machine commands for the illumination control system 1500, particularly commands to activate one or more light sources 1508. The controller 1502, via the agent 1504, operates one or more light sources 1508 that produces light of a selected brightness or operate one or more of the light sources 1508 at a selected brightness level that provides a desired level of illumination of a detected implement. For example, brightness of the illumination directed to the detected implement may be varied depending on a distance the implement is from the vehicle and, hence, the light sources 1508. For example, as a lateral distance along the detected implement from the vehicle increases, a brightness of the applied illumination may also be increased. The controller 1502 is also operable to prevent actuation of light sources 1508 that would produce illumination not directed towards the implement. Thus, the controller 1502 selectively operates light sources to provide targeted illumination at selected brightness levels to fully illuminate an implement while avoiding illumination not directed to the implement.

The controller 1502 may be in the form of a computer system, as described in more detail below, and the agent 1504 may be in the form of software running on one or more processors 1513 of the controller 1502. As described in more detail below, the agent 1504 uses machine learning, such as a machine learning model as described in more detail below, to analyze sensor data, such as one or more images from one or more cameras, to determine that one or more implements is present in the received images. Machine learning detect an implement using a comparison of the received images with reference data. The reference data may be in the form of reference images. The agent 1504 may also determine, based on a comparison with the reference data, a position and a size of a detected implement. Further, the agent 1504 may also determine longitudinal and lateral extents of the detected implement. In response to detecting an implement and determining other positional and size information associated with the implement by the agent 1504, the controller 1502 selectively actuates one or more light sources 1508 to provide illumination of the implement. In some implementations, the controller 1502 operates light sources 1508 at a desired level of illumination to fully illuminate the implement. The light sources 1508 may form part of a lighting system that is attached to or integrated into a vehicle coupled to the implement, and, in some implementations, the controller 1502 may selectively operate a number of the light sources 1508 to illuminate the detected implement in its entirety and produce light of a selected brightness to illuminate the implement at a desired level.

Although three light sources 1508 are illustrated, additional or fewer light sources 1508 may be included. Further, where the light sources 1508 form a lighting system, the lighting system may be any of the types of lighting systems described herein or otherwise encompassed by the present disclosure.

The system 1500 also includes a user interface 1510, which may be of a type described below. The user interface 1510 may be connected via a wired or wireless connection. Further, the user interface 1510 may be located remote from the controller 1502. A user may utilize the user interface 1510 to input data into the system 1500. The system 1500 also includes a memory device 1512 and the processor 1513. Although the memory device 1512 is shown as being separate from the controller 1502, in some implementations, the memory device 1512 may be integrated into the controller 1502 or communicably coupled to the controller 1502 via a wired or wireless connection. In other implementations, the memory device 1512 may be remotely located. The memory device 1512 communicates with the processor 1513 and is used to store software and data, such as the reference data described above. Although a single memory device 1512 and a single processor 1513 are illustrated, in other implementations, a plurality of memory devices, processors, or both may be used. The system 1500 may also include a display 1514. The display 1514 may be used to present information to a user or, where the display includes a touch screen, the display 1514 may be used as an input device.

The following description provides some examples using machine learning that may be used to detect and illuminate one or more implements coupled to an agricultural vehicle, for example. However, the scope of the disclosure is not limited to the described examples, and, consequently, other types of machine learning may be used and are within the scope of the present disclosure.

The agent 1504 generates commands that cause the controller 1502 to selectively operate the light sources 1508 as described herein, thereby improving an overall performance of the illumination control system 1500. In some implementations, the agent 1504 executing on the controller 1502, such as on the processor 1513 of the controller 1502, can be described as executing the following function:

$$a = F(s) \tag{1}$$

where s is sensor input data, such as image data; the a is an output action, such as a light activation command; and the function F the a machine learning model 1505 that functions to generate the output actions that improve the performance of the illumination control system 1500 given sensor input data. Generally, the sensor input data s is a representation of the sensed information, e.g., images or measurements, received from the sensors 1506.

In some implementations, the machine learning model 1505 can use any function or method to model operation of the illumination control system 1500, e.g., operation of the light sources 1506. In illustrated example, the machine learning model 1505 used by the agent 15604 includes a database of reference data, such as reference image data, to dynamically generate commands for controlling the light sources 1506, so as to provide targeted illumination of a detected implement. In various configurations the model can be any of: function approximators, probabilistic dynamics models such as Gaussian processes, neural networks, or any other similar model. In various configurations, the agent 1504 and the machine learning model 1505 can be trained using any of: Q-learning methods, state-action-state-reward methods, deep Q network methods, actor-critic methods, or any other method of training an agent 1504 and machine learning model 1505 such that the agent 1504 can control the illumination control system 1500 based on the machine learning model 1505.

In some implementations, the agent 1504 executes the machine learning model 1505 that includes deterministic methods that have been trained with reinforcement learning (thereby creating a reinforcement learning model). The machine learning model 1505 is trained to increase the recognize an implement based on received sensor data and activate one or more light sources to illuminate the implement while not activating other light sources that would not provide illumination to the implement.

Reinforcement learning is a machine learning system in which a machine learns "what to do," i.e., which light sources to actuate in order to illuminate an implement and which light sources not to actuate that would not provide illumination to the implement, so as to maximize a numerical reward signal. The learner (e.g. the illumination control system 1500) is not told which actions to take (e.g., generating commands to illuminate light sources), but instead discovers which actions yield the most reward (e.g., actuation of light sources to illuminate the implement while not actuating light sources whose light would not illuminate the implement) by trying the different actions, e.g., operating the different light sources. In some cases, actions may affect not only the immediate reward but also the next situation and, through that, all subsequent rewards. These two characteristics, i.e., trial-and-error and search and delayed reward, are two distinguishing features of reinforcement learning.

Reinforcement learning is defined not by characterizing learning methods, but by characterizing a learning problem. Basically, a reinforcement learning system captures those important aspects of the problem facing a learning agent interacting with its environment to achieve a goal. That is, in the example of an illumination control system, the reinforcement learning system captures the system dynamics of the illumination control system's operation in the context of implement illumination in reduced lighting conditions. Particularly, the reinforcement learning system learns to which light sources to illuminate and which light sources not to illuminate in order to illuminate implements coupled to a vehicle in reduced lighting conditions. Such an agent senses the state of the environment and takes actions that affect the state to achieve a goal or goals, such as fully illuminating one or more implements coupled to an agricultural vehicle without introducing illumination that does not serve to illuminate the one or more implements. Further, a goal may also be to provide illumination at a selected level of brightness, for example, to illuminate one or more portions of an implement that is located a greater distance from the light source than one or more other portions of the implement. The formulation of reinforcement learning includes three aspects for the learner: sensation, action, and goal.

Continuing with the illumination control system example, the illumination control system senses the state of the environment with sensors, e.g., whether one or more implements are coupled to or are in close proximity to the illumination control system and, hence, an agricultural vehicle having the illumination control system. The illumination control system takes actions in that environment with machine commands, such as activating one or more lights to illuminate the detected implement and learning which lights are successful in providing desired illumination for an implement having a particular placement relative to the agricultural vehicle. Again, the placement of the implement relative to the agricultural vehicle is provided by the sensor data. The illumination control system achieves a goal that is a measure of how well the provided illumination achieves the goal of, for example, fully illuminating the implement while avoiding introducing additional illumination that does not provide illumination of the implement.

A challenge that arises in reinforcement learning is the trade-off between exploration and exploitation. To increase the reward in the system, a reinforcement learning agent prefers actions that it has tried in the past and found to be effective in producing reward. However, to discover actions that produce reward, the learning agent selects actions that have not been previously selected. The agent 'exploits' information that the agent already knows in order to obtain a reward, but it also 'explores' information in order to make better action selections in the future. The learning agent tries a variety of actions and progressively favors those that appear to be best while still attempting new actions. On a stochastic task, each action is generally tried many times to gain a reliable estimate to its expected reward. For example, if the illumination control system is executing an agent that knows which light sources to activate for an implement located at a particular position relative to the agricultural vehicle, such as by a position of the implement within an image, the agent may change which light sources are activated for an implement detected in an image that occupies a different position within an image to determine if the change in light sources activated provides illumination that satisfies the desired criteria, e.g., fully illuminating the implement without providing illumination that does not illuminate the implement.

Further, reinforcement learning considers the whole problem of a goal-directed agent interacting with an uncertain environment. Reinforcement learning agents have explicit goals, can sense aspects of their environments, and can choose actions to receive high rewards (i.e., increase system performance). Moreover, agents generally operate despite significant uncertainty about the environment it faces. When reinforcement learning involves planning, the system addresses the interplay between planning and real-time action selection, as well as the question of how environmental elements are acquired and improved. For reinforcement learning to make progress, important sub problems have to be isolated and studied, the sub problems playing clear roles in complete, interactive, goal-seeking agents.

The reinforcement learning problem is a framing of a machine learning problem where interactions are processed, and actions are performed to achieve a goal. The learner and decision maker is called the agent (e.g., agent 1504 of illumination control system 1500). The thing with which the agent interacts, which includes everything outside the agent, is called the environment (e.g., a field in which an illumination control system is located, ambient lighting conditions, etc.). The agent and the environment interact continually, with the agent selecting actions (e.g., machine commands for the operation of light sources) and with the environment responding to those actions and presenting new situations to the agent (e.g., a change in an image after activation of one or more light sources). The environment also gives rise to rewards, which are special numerical values that the agent tries to maximize over time. In one context, the rewards act to improve or maximize system performance over time. System performance is improved when a difference between an achieve performance and a target performance or goal is reduced. System performance may be considered to be maximized when the achieved performance matches the target performance or goal. A complete specification of an environment defines a task which is one instance of the reinforcement learning problem.

Figure 16:
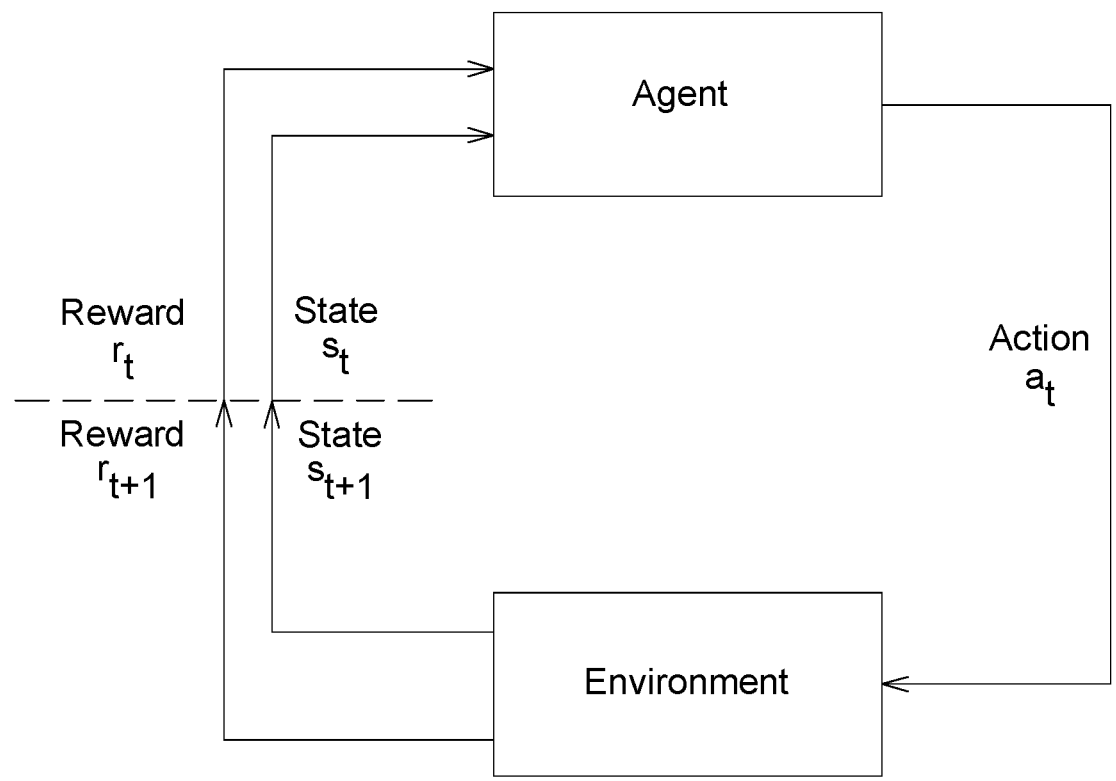
FIG. 16 is a schematic view illustrating a relationship between an agent and an environment of in example reinforcement learning system, according to some implementations of the present disclosure.

FIG. 16 diagrams the agent-environment interaction. More specifically, the agent and environment interact at each of a sequence of discrete time steps, e.g., at discrete time steps, t, where t=0, 1, 2, 3, etc. At each time step t, the agent receives some representation of a state of the environment, $s_t$. The states $s_t$ may be, for example, measurements from a sensor. Sensor measurements may be in the form of one or more images of a field in which an implement is to be detected. The states $s_t$ are within S, where S is a set of possible states. Based on the state $s_t$ and the time step t, the agent selects an action $a_t$ (e.g., a set of machine commands to change a configuration of an illumination control system, such as activation or deactivation of one or more light sources of the illumination control system 1500). The action $a_t$ is within $A(s_t)$, where $A(s_t)$ is a set of possible actions. One time state later, in part as a consequence of its action, the agent receives a numerical reward $r_{t+1}$. The states $r_{t+1}$ are within R, where R is a set of possible rewards. Once the agent receives the reward, the agent selects in a new state $s_{t+1}$.

At each time step, the agent implements a mapping from states to probabilities of selecting each possible action. This mapping is called the agent's policy and is denoted $\pi_t$, where $\pi_t(s,a)$ is the probability that $a_t$=a if $s_t$=s. Reinforcement learning methods can dictate how the agent changes its policy as a result of the states and rewards resulting from agent actions. The agent's goal is to maximize the total amount of reward it receives over time.

This reinforcement learning framework is flexible and can be applied to many different problems in many different ways (e.g., to illumination of an implement in a darkened field). The framework proposes that whatever the details of the sensory, memory, and control apparatus, any problem (or objective) of learning goal-directed behavior can be reduced to three signals passing back and forth between an agent and its environment. These three signals include one signal to represent the choices made by the agent (the actions), one signal to represent the basis on which the choices are made (the states), and one signal to define the agent's goal (the rewards).

Continuing, the time steps between actions and state measurements need not refer to fixed intervals of real time. Those time steps can refer to arbitrary successive stages of decision-making and acting. The actions can be low-level controls, such as the voltages applied to the light sources of an illumination control system, or high-level decisions, such as whether an implement is detected in an image. Similarly, the states can take a wide variety of forms. For example, the states can be completely determined by low-level sensations, such as direct sensor readings, or the states can be more high-level, such as symbolic descriptions of the illumination quality. States can be based on previous sensations or even be subjective. Similarly, actions can be based previous actions, policies, or can be subjective. In general, actions can be any decisions the agent learns how to make to achieve a reward, and the states can be anything the agent can know that might be useful in selecting those actions.

Additionally, the boundary between the agent and the environment is generally not solely physical. For example, some aspects of an illumination control system, for example sensors 1506, or the field in which an agricultural vehicle having the illumination control system operates, can be considered parts of the environment rather than parts of the agent. Generally, anything that cannot be changed by the agent at the agent's discretion is considered to be outside of the agent and part of the environment. The agent-environment boundary represents the limit of the agent's absolute control, not of the agent's knowledge. As an example, the size of a tire of an agricultural vehicle can be part of the environment, because the tire cannot be changed by the agent. However, a light source of an illumination control system (e.g., light source 1508) can be part of the agent, because the light source is changeable by the agent. Additionally, ambient lighting of a field in which the agricultural vehicle operates can be part of the environment, because the agent is unable to change the ambient illumination. Similarly, rewards are computed inside the physical entity of a controller containing the agent, such as controller 1502, and artificial learning system, but are considered external to the agent.

The agent-environment boundary can be located at different places for different purposes. In an agricultural vehicle, many different agents may be operating at once, each with its own boundary. For example, one agent may make high-level decisions which form part of the states faced by a lower-level agent that implements the high-level decisions. In practice, the agent-environment boundary can be determined based on states, actions, and rewards, and can be associated with a specific decision-making task of interest.

Particular states and actions vary greatly from application to application, and how they are represented can strongly affect the performance of the implemented reinforcement learning system.

A variety of methodologies used for reinforcement learning are described below. Any aspect of any of these methodologies can be applied to a reinforcement learning system within an illumination control system operable to provide targeted illumination. In some implementation, the agent may be viewed as an agricultural vehicle having an illumination control system and the environment may be elements of a field in which the agricultural vehicle operates an which is not under direct control of the agricultural vehicle. States are measurements of the environment and how the agricultural vehicle and, more particularly, the illumination control system, is interacting within the environment; actions are decisions actions taken by the agent to affect states; and results are a numerical representation to improvements (or decreases) of states.

Reinforcement learning models can be based on estimating state-value functions or action-value functions. These functions of states, or of state-action pairs, estimate the value of the agent to be in a given state (or how valuable performing a given action in a given state is). The idea of 'value' is defined in terms of future rewards that can be expected by the agent, or, in terms of expected return of the agent. The rewards the agent can expect to receive in the future depend on what actions it will take. Accordingly, value functions are defined with respect to particular policies.

Recall that a policy, $\pi$, is a mapping from each state, $s \in S$, and action $a \in A$ (or $a \in A(s)$), to the probability $\pi(s,a)$ of taking action a when in states. Given these definitions, the policy $\pi$ is the function F in Equation 1. Informally, the value of a state s under a policy n, denoted $V\pi(s)$, is the expected return when starting in s and following $\pi$ thereafter. For example, we can define $V\pi(s)$ formally as:

$$V^\pi(s) = E_\pi\{R_t|s_t=s\} = E_\pi\{\Sigma_{k=0}^\infty \gamma^k r_{t+k+1}|s_t=S\} \quad (2)$$

where $E\pi\{\ \}$ denotes the expected value given that the agent follows policy $\pi$, $\gamma$ is a weight function, and t is any time step. Note that the value of the terminal state, if any, is generally zero. The function $V\pi$ the state-value function for policy $\pi$.

Similarly, the value of taking action a in state s under a policy $\pi$, denoted $Q\pi(s,a)$, is defined as the expected return starting from s, taking the action a, and thereafter following policy $\pi$:

$$Q^\pi(s,a) = E_\pi\{R_t|s_t=s,a_t=a\} = E_\pi\{\Sigma_{k=0}^\infty \gamma^k r_{t+k+1}|s_t=s|a_t=a\} \quad (3)$$

where $E\pi\{\ \}$ denotes the expected value given that the agent follows policy $\pi$, $\gamma$ is a weight function, and t is any time step. Note that the value of the terminal state, if any, is generally zero. The function $Q\pi$, can be called the action-value function for policy $\pi$.

The value functions $V\pi$ and $Q\pi$ can be estimated from experience. For example, if an agent follows policy $\pi$ and maintains an average, for each state encountered, of the actual returns that have followed that state, then the average will converge to the state's value, $V\pi(s)$, as the number of times that state is encountered approaches infinity. If separate averages are kept for each action taken in a state, then these averages will similarly converge to the action values, $Q\pi(s,a)$. Estimation methods of this kind are referred to as Monte Carlo (MC) methods because they involve averaging over many random samples of actual returns. In some cases, there are many states, and keep separate averages for each state individually may not be practical. Instead, the agent can maintain $V\pi$ and $Q\pi$ as parameterized functions and adjust the parameters to better match the observed returns. This can also produce accurate estimates, although much depends on the nature of the parameterized function approximator.

One property of state-value functions and action-value functions used in reinforcement learning and dynamic programming is that they satisfy particular recursive relationships. For any policy $\pi$ and any state s, the following consistency condition holds between the value of s and the value of its possible successor states:

$$V^\pi(s) = E_\pi\{R_t|s_t=s\} = \quad (4)$$

$$E_\pi\left\{\sum_{k=0}^\infty \gamma^k r_{t+k+1}|s_t=s\right\} = E_\pi\left\{r_{t+1} + \gamma \sum_{k=0}^\infty \gamma^k r_{t+k+2}|s_t=s\right\} =$$

$$\sum_a \pi(s,a) \sum_{s'} p_{ss'}^a [R_{ss'}^a + \gamma V^\pi(s')]$$

where P are a set of transition probabilities between subsequent states from the actions a taken from the set A(s), R represents expected immediate rewards from the actions a taken from the set A(s), and the subsequent states s' are taken from the set S, or from the set S' in the case of an episodic problem. This equation is the Bellman equation for $V\pi$. The Bellman equation expresses a relationship between the value of a state and the values of its successor states. More simply, Equation 4 is a way of visualizing the transition from one state to its possible successor states. From each of these, the environment could respond with one of several subsequent states s' along with a reward r. The Bellman equation averages over all the possibilities, weighting each by its probability of occurring. The equation states that the value of the initial state equal the (discounted) value of the expected next state, plus the reward expected along the way. The value function $V\pi$ is the unique solution to its Bellman equation. These operations transfer value information back to a state (or a state-action pair) from its successor states (or state-action pairs).

Continuing with methods used in reinforcement learning systems, the description now turns to policy iteration. Once a policy, $\pi$, has been improved using $V\pi$ to yield a better policy, $\pi'$, the system can then compute $V\pi'$ and improve the policy again to yield an even better $\pi''$. The system then determines a sequence of monotonically improving policies and value functions:

$$\pi_0 \xrightarrow{E} V^{\pi_0} \xrightarrow{I} \pi_1 \xrightarrow{E} V^{\pi_1} \xrightarrow{I} \pi_2 \xrightarrow{E} \ldots \xrightarrow{I} \pi^* \xrightarrow{E} V^* \quad (5)$$

where E denotes a policy evaluation and I denotes a policy improvement. Each policy is generally an improvement over the previous policy (unless the policy has reached been optimized, such as by obtaining a target value). In reinforcement learning models that have only a finite number of policies, this process can converge to an optimal policy and optimal value function in a finite number of iterations.

This way of finding an optimal policy is called policy iteration. An example model for policy iteration is given in FIG. 17. Note that each policy evaluation, itself an iterative computation, begins with the value (either state or action) function for the previous policy. Typically, this results in an increase in the speed of convergence of policy evaluation.

Continuing with methods used in reinforcement learning systems, the description turns to value iteration. Value iteration is a special case of policy iteration in which the policy evaluation is stopped after just one sweep (one backup of each state). It can be written as a particularly simple backup operation that combines the policy improvement and truncated policy evaluation steps:

$$V_{k+1}(s) = max_a E_\pi\{\{r_{t+1} = \gamma V_k(s_{t+1}) | s_t = s | a_t = a\} = \qquad (6)$$

$$max_a \sum_a \pi(s, a) \sum_{s'} p^a_{ss'}[R^a_{ss'} + \gamma V^\pi(s')]$$

for all s∈S, where $max_a$ selects the highest value function. For an arbitrary $V_0$, the sequence $\{V_k\}$ can be shown to converge to V* under the same conditions that guarantee the existence of V*.

Another way of understanding value iteration is by reference to the Bellman equation (previously described). Note that value iteration is obtained simply by turning the Bellman equation into an update rule to a model for reinforcement learning. Further, note how the value iteration backup is similar to the policy evaluation backup except that the maximum is taken over all actions. Another way of seeing this close relationship is to compare the backup diagrams for these models. These two are the natural backup operations for computing Vπ and V*.

Similar to policy evaluation, value iteration formally uses an infinite number of iterations to converge exactly to V*. In practice, value iteration terminates once the value function changes by only a small amount in an incremental step. FIG. 18 gives an example value iteration model with this kind of termination condition.

Value iteration effectively combines, in each of its sweeps, one sweep of policy evaluation and one sweep of policy improvement. Faster convergence is often achieved by interposing multiple policy evaluation sweeps between each policy improvement sweep. In general, the entire class of truncated policy iteration models can be thought of as sequences of sweeps, some of which use policy evaluation backups and some of which use value iteration backups. Since the $max_a$ operation is the only difference between these backups, this indicates that the $max_a$ operation is added to some sweeps of policy evaluation.

Both temporal difference (TD) and MC methods use experience to solve the prediction problem. Given some experience following a policy π, both methods update estimates V of V*. If a nonterminal state $s_t$ is visited at time t, then both methods update estimate $V(s_t)$ based on what happens after that visit. Generally, Monte Carlo methods wait until the return following the visit is known, then use that return as a target for $V(s_t)$. A simple every-visit MC method applicable for nonstationary environments is:

$$V(s) \leftarrow V(s_t) + \alpha[R_t - V(s_t)] \qquad (7)$$

where $R_t$ is the actual return following time t and a is a constant step-size parameter. Generally, MC methods wait until the end of the episode to determine the increment to $V(s_t)$ and only then is $R_t$ known, while TD methods need wait only until the next time step. At time t+1, TD methods immediately form a target and make an update using the observed reward $r_{t+1}$ and the estimate $V(s_{t+1})$. The simplest TD method, known as TD(t=O), is:

$$V(s_t) \leftarrow V(s_t) + \alpha[r_{t+1} + \gamma V(s_{t+1}) - V(s_t)] \qquad (8)$$

In effect, the target for the Monte Carlo update is $R_t$, whereas the target for the TD update is:

$$r_{t+1} + \gamma V(s_{t+1}) \qquad (9)$$

Because the TD method bases an update in part on an existing estimate, the TD method is described as a bootstrapping method. From previously, $$V^\pi(s) = E_\pi\left\{\sum_{k=0}^\infty \gamma^k r_{t+k+1} | s_t = s\right\} \qquad (10)$$

$$= E_\pi\left\{r_{t+1} + \gamma \sum_{k=0}^\infty \gamma^k r_{t+k+2} | s_t = s\right\} \qquad (11)$$

Roughly speaking, Monte Carlo methods use an estimate of Equation 10 as a target, whereas other methods use an estimate of Equation 11 as a target. The MC target is an estimate because the expected value in Equation 10 is not known; a sample return is used in place of the real expected return. The other method target is an estimate not because of the expected values, which are assumed to be completely provided by a model of the environment, but because Vπ $(s_{t+1})$ is not known and the current estimate, $V_t(s_{t+1})$ is used instead. The TD target is an estimate for both reasons: the TD target samples the expected values in Equation 11 and uses the current estimate $V_t$ instead of the true Vπ. Thus, TD methods combine the sampling of MC with the bootstrapping of other reinforcement learning methods.

In some implementations, TD and Monte Carlo updates may be referred to as sample backups because these methods involve looking ahead to a sample successor state (or state-action pair), using the value of the successor and the reward along the way to compute a backed-up value, and then changing the value of the original state (or state-action pair) accordingly. Sample backups differ from the full backups of DP methods in that sample backups are based on a single sample successor rather than on a complete distribution of all possible successors. An example model for temporal-difference calculations is given in procedural from in FIG. 19.

Another method used in reinforcement learning systems is an off-policy TD control model known as Q-learning. The simplest form of Q-learning, referred to as one-step Q-learning, is defined by:

$$Q(s_t, a_t) \leftarrow Q(s_t, a_t) + \alpha[r_{t+1} + \gamma \; max_a \; Q(s_{t+1}, a) - Q(s_t, a_t)] \qquad (12)$$

In this case, the learned action-value function Q directly approximates Q*, the optimal action-value function, independent of the policy being followed. This simplifies the analysis of the model and enabled early convergence proofs. The policy still has an effect in that it determines which state-action pairs are visited and updated. However, all that is required for correct convergence is that all pairs continue to be updated. This is a minimal requirement in the sense that any method guaranteed to find optimal behavior in the general case uses it. Under this assumption and a variant of the usual stochastic approximation conditions on the sequence of step-size parameters has been shown to converge with probability 1 to Q*. The Q-learning model is shown in procedural form in FIG. 20.

Other methods used in reinforcement learning systems use value prediction. Generally, the discussed methods are trying to predict that an action taken in the environment will increase the reward within the agent environment system. Viewing each backup (i.e., previous state or action-state pair) as a conventional training example in this way enables use of any of a wide range of existing function approximation methods for value prediction. In reinforcement learning, learning should be able to occur on-line, while interacting with the environment or with a model (e.g., a dynamic model) of the environment. To do this involves methods that are able to learn efficiently from incrementally acquired data. In addition, reinforcement learning generally uses function approximation methods able to handle nonstationary target functions (target functions that change over time). Even if the policy remains the same, the target values of training examples are nonstationary if they are generated by bootstrapping methods (TD). Methods that cannot easily handle such nonstationary target functions are less suitable for reinforcement learning.

Figure 21:
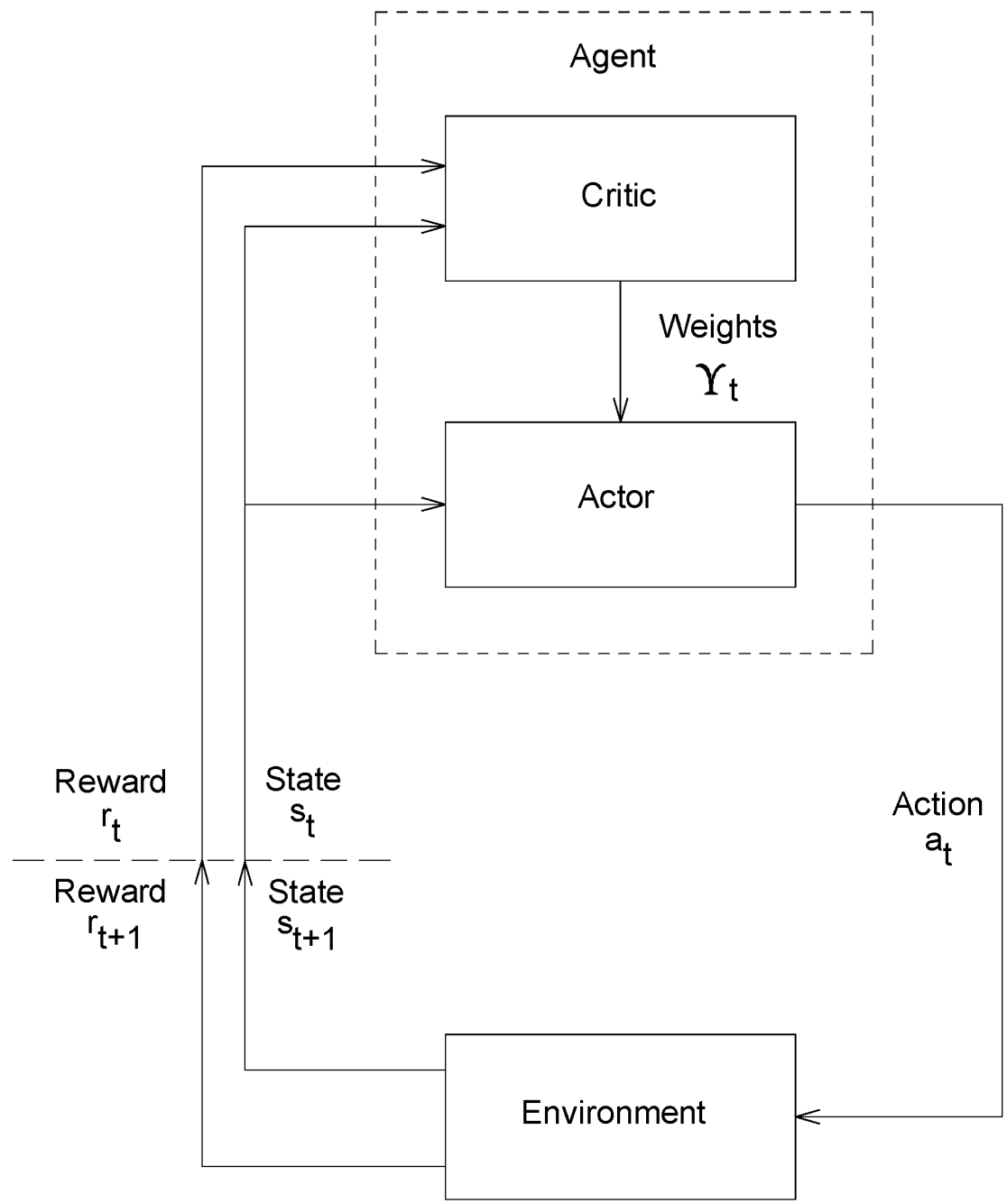
FIG. 21 is a schematic of an example interface between an agent and an environment for an agent that includes an actor and a critic, according to some implementations of the present disclosure.

Another example of a reinforcement learning method is an actor-critic method. The actor-critic method can use temporal difference methods or direct policy search methods to determine a policy for the agent. The actor-critic method includes an agent with an actor and a critic. The actor inputs determined state information about the environment and weight functions for the policy and outputs an action. The critic inputs state information about the environment and a reward determined from the states and outputs the weight functions for the actor. The actor and critic work in conjunction to develop a policy for the agent that maximizes the rewards for actions. FIG. 21 illustrates an example of an agent-environment interface for an agent including an actor and critic.

Further description of various elements of reinforcement learning can be found in the publications, "Playing Atari with Deep Reinforcement Learning" by Mnih et al., "Continuous Control with Deep Reinforcement Learning" by Lillicrap et al., and "Asynchronous Methods for Deep Reinforcement Learning" by Mnih et. al, all of which are incorporated by reference herein in their entirety.

The machine learning models described herein, such as machine learning model 1505, can also be implemented using an artificial neural network (ANN). That is, an agent, such as agent 1504, executes a machine learning model, such as machine learning model 1505, that is an ANN. The machine learning model including an ANN determines output action vectors (machine commands) for a machine, device, or system (such as illumination control system 1500) using input state vectors (e.g., measurements). The ANN has been trained such that determined actions from elements of the output action vectors increase the performance of a machine, device, or system (collectively referred to as "system").

Figure 22:
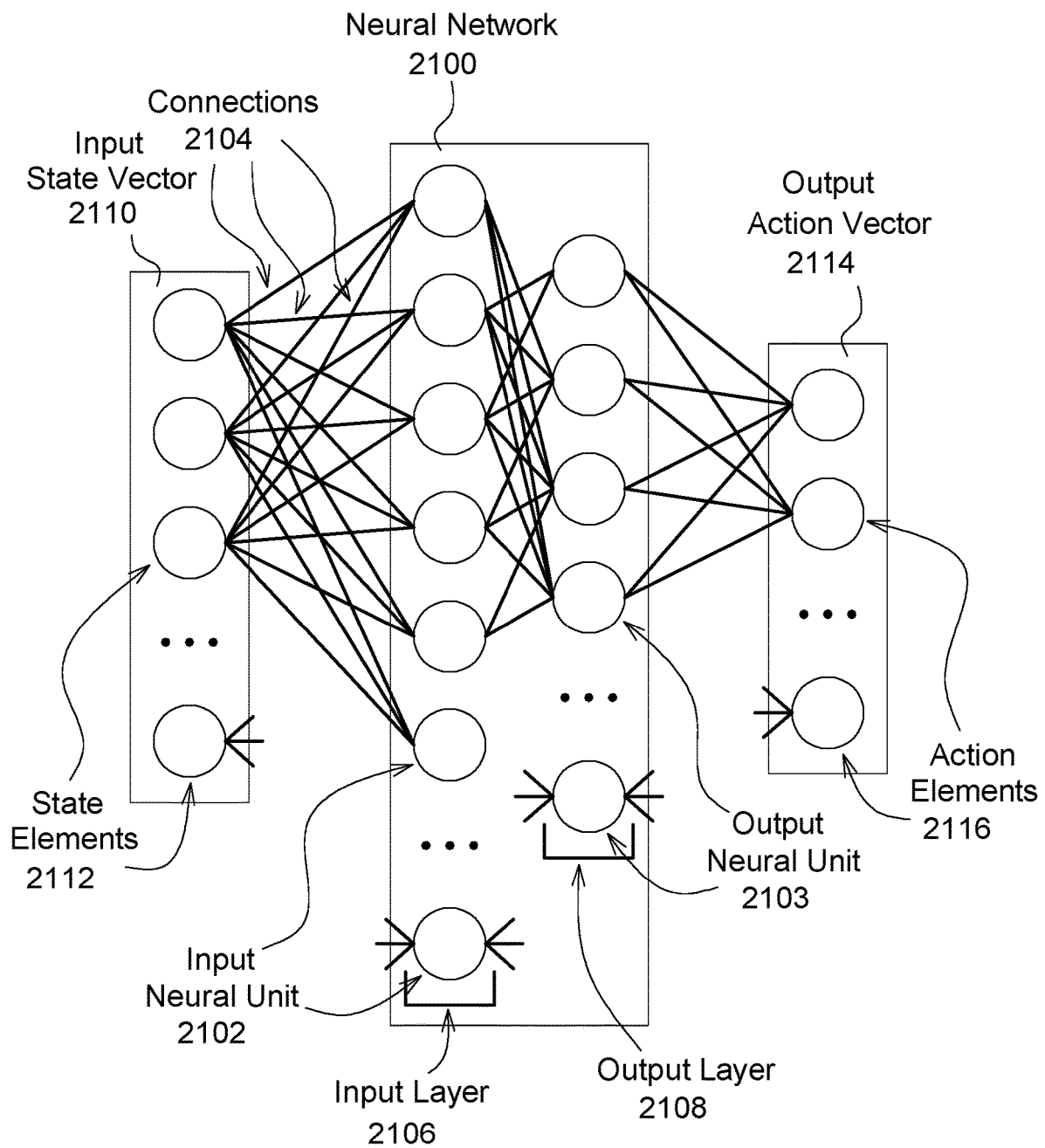
FIG. 22 is an illustration of an example artificial neural network that is usable to generate actions that improve system performance, according to some implementations of the present disclosure.

FIG. 22 is an illustration of an ANN 2200 of a machine learning model, such as machine learning model 1505, according to some implementations. The ANN 2200 is based on a large collection of simple neural units, such as input neural units 2202 and output neural units 2203. The neural units can be an action a, a state s, or any function relating actions a and states s for the system. Each neural unit is connected with many others, and connections 2204 can enhance or inhibit adjoining neural units. Each individual neural unit can compute using a summation function based on all of the incoming connections 2204. There may be a threshold function or limiting function on each connection 2204 and on each neural unit itself, such that the neural units signal must surpass the limit before propagating to other neurons. These systems are self-learning and trained, rather than explicitly programmed. Here, the goal of the ANN is to improve the system performance by providing outputs to carry out actions to interact with an environment, learning from those actions, and using the information learned to influence actions towards a future goal. In some implementations, the learning process to train the ANN is similar to policies and policy iteration described above. For example, in some implementations, a system obtains a first set of sensor data, such as image data from one or more cameras. A controller of the system using the ANN may detect an implement and activate one or more lights in an effort to illuminate the detected implement. The controller may receive subsequent second set of sensor data to determine how successful the detection and illumination effort was. Based on the sensor data, the agent determines a reward which is used to train the agent. Each additional set of sensor data, e.g., subsequent first and second data sets, continually trains itself using a policy iteration reinforcement learning model to improve machine performance, e.g., implement detection quality and illumination effectiveness.

The neural network of FIG. 22 includes two layers: an input layer 2206 and an output layer 2208. The input layer 2206 has input neural units 2202 which send data via connections 2204 to the output neural units 2203 of the output layer 2208. In other configurations, an ANN can include additional hidden layers between the input layer 2206 and the output layer 2208. The hidden layers can have neural units connected to the input layer 2206, the output layer 2208, or other hidden layers depending on the configuration of the ANN. Each layer can have any number of neural units and can be connected to any number of neural units in an adjacent layer. The connections 2204 between neural layers can represent and store parameters, herein referred to as weights, that affect the selection and propagation of data from a particular layer's neural units to an adjacent layer's neural units. Reinforcement learning trains the various connections 2204 and weights such that the output of the ANN 2200 generated from the input to the ANN 2200 improves system performance. Finally, each neural unit can be governed by an activation function that converts a weighted input of a neural unit to an output activation of the neural unit (i.e., activating a neural unit in a given layer). Some example activation functions that can be used are: the softmax, identify, binary step, logistic, tanH, Arc Tan, softsign, rectified linear unit, parametric rectified linear, bent identity, sing, Gaussian, or any other activation function for neural networks.

Mathematically, an ANN's function (F(s), as introduced above) is defined as a composition of other sub-functions $g_i(x)$, which can further be defined as a composition of other sub-sub-functions. The ANN's function is a representation of the structure of interconnecting neural units and that function can work to increase agent performance in the environment. The function, generally, can provide a smooth transition for the agent towards improved performance as input state vectors change and the agent takes actions.

Most generally, the ANN 2200 can use the input neural units 2202 and generate an output via the output neural units 2203. In some configurations, input neural units 2202 of the input layer 2206 can be connected to an input state vector 2210 (e.g., s). The input state vector 2210 can include any information regarding current or previous states, actions, and rewards of the agent in the environment (state elements 2212). Each state element 2212 of the input state vector 2210 can be connected to any number of input neural units 2202. The input state vector 2210 can be connected to the input neural units 2202 such that ANN 2200 can generate an output at the output neural units 2203 in the output layer 2208. The output neural units 2203 can represent and influence the actions taken by an agent executing a machine learning model. In some configurations, the output neural units 2203 can be connected to any number of action elements 2216 of an output action vector 2214 (e.g., a). Each action element can represent an action the agent can take to improve system performance. In another configuration, the output neural units 2203 themselves are elements of an output action vector.

In some implementations, similar to FIG. 21, an agent, such as agent 1504, executes a machine learning model, such as machine learning model 1505, using an ANN trained using an actor-critic training method as described earlier. The actor and critic are two similarly configured ANNs in that the input neural units, output neural units, input layers, output layers, and connections are similar when the ANNs are initialized. At each iteration of training, the actor ANN receives as input an input state vector and, together with the weight functions (for example, γ as described above) that make up the actor ANN (as they exist at that time step), outputs an output action vector. The weight functions define the weights for the connections connecting the neural units of the ANN. The agent takes an action in the environment that can affect the state and the agent measures the state. The critic ANN receives as input an input state vector and a reward state vector and, together with the weight functions that make up the critic ANN, outputs weight functions to be provided to the actor ANN. The reward state vector is used to modify the weighted connections in the critic ANN such that the outputted weights functions for the actor ANN improve machine performance. This process continues for every time step, with the critic ANN receiving rewards and states as input and providing weights to the actor ANN as outputs, and the actor ANN receiving weights and rewards as inputs and providing an action for the agent as output.

The actor-critic pair of ANNs work in conjunction to determine a policy that generates output action vectors representing actions that improve system performance from input state vectors measured from the environment. After training, the actor-critic pair is said to have determined a policy, the critic ANN is discarded, and the actor ANN is used as the machine learning model for the agent.

In this example, the reward data vector can include elements with each element representing a measure of a performance metric of the system after executing an action. The performance metrics can include, in one example, an image of a portion of an area surrounding a vehicle. The performance metrics can be determined from any of the measurements received from sensors, such as sensor 1506. Each element of the reward data vector is associated with a weight defining a priority for each performance metric such that certain performance metrics can be prioritized over other performance metrics. In some implementations, the reward vector is a linear combination of the different metrics. In some examples, the operator of the combine can determine the weights for each performance metric by interacting with an interface, such as interface 1510, of the system. The critic ANN determines a weight function including a number of modified weights for the connections in the actor ANN based on the input state vector and the reward data vector.

Training the ANN can be accomplished using real data such as actual images of an implement coupled to an agricultural vehicle and how such an implement may appear when partially or fully illuminated in a reduced ambient lighting environment. Thus, in one configuration, the ANNs of the actor-critic method can be trained using a set of input state vectors from an illumination control system taking any number of actions based on an output action vectors. The input state vectors and output action vectors can be accessed from memory of a system, such as memory 1512 of the illumination control system 1500.

In some implementations, a large amount of data may be used to train ANNs. In some instances, the large amount of data may be costly to obtain. In other implementations, the ANNs of the actor-critic method can be trained using a set of simulated input state vectors and simulated output action vectors. The simulated vectors can be generated from a set of seed input state vectors and seed output action vectors obtained from illumination control systems illuminating an implement. In this example, in some configurations, the simulated input state vectors and simulated output action vectors can originate from an ANN configured to generate actions that improve system performance.

Figure 23:
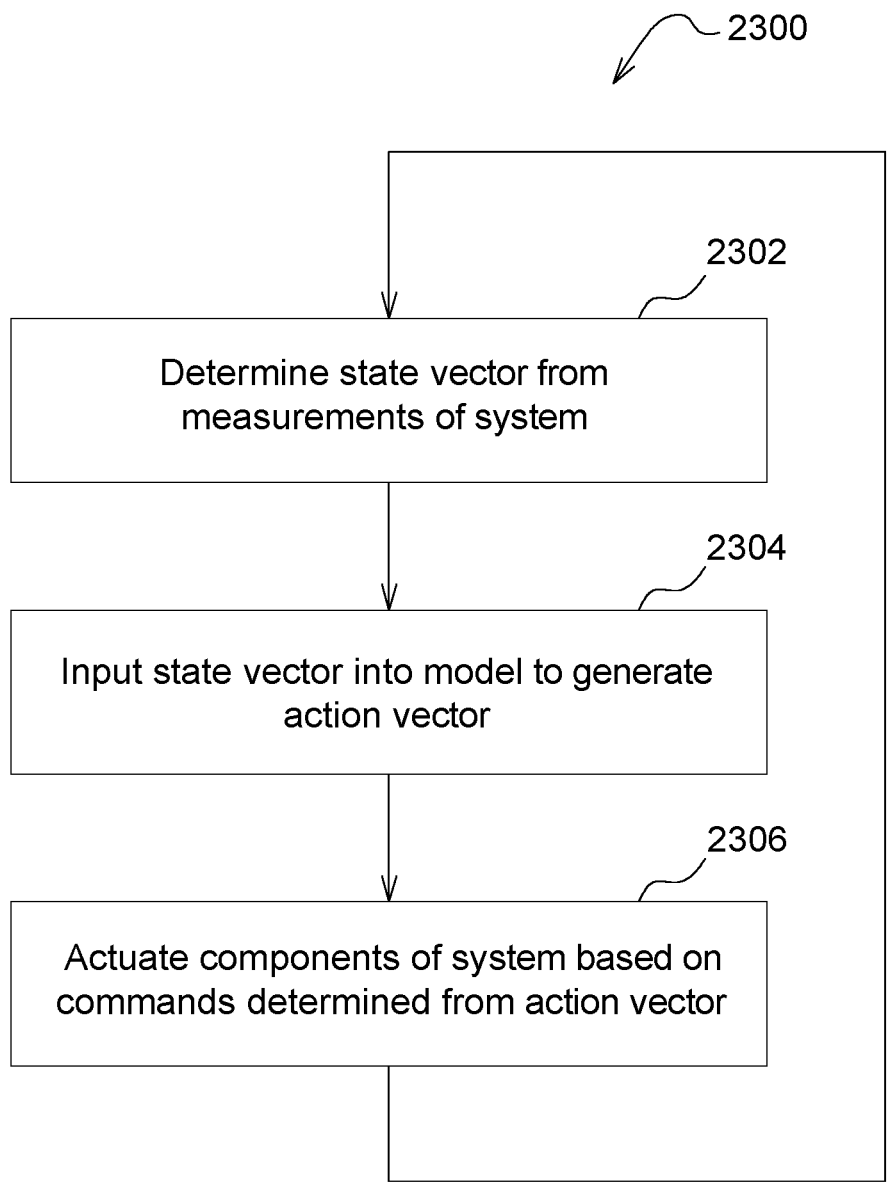
FIG. 23 is a flow diagram of an example method for generating actions that improve performance of an illumination control system using an agent that executes a machine learning model having an artificial neural net trained using an actor-critic method, according to some implementations of the present disclosure.

This section describes an agent, such as the agent 1504, executing a machine learning model, such as machine learning model 1505, for improving the detection and illumination of an implement in proximity to an illumination control system, such as illumination control system 1500, and, particularly, to detection and illumination of an implement coupled to an agricultural vehicle that includes the illumination control system. In this example, the machine learning model is a reinforcement learning model implemented using an artificial neural net similar to the ANN of FIG. 22. That is, the ANN includes an input layer including a number of input neural units and an output layer including a number of output neural units. Each input neural unit is connected to any number of the output neural units by any number of weighted connections. The agent inputs sensor data, such as in the form of image data, to the input neural units and the machine learning model outputs actions for an illumination control system to the output neural units. The agent determines a set of machine commands based on the output neural units representing actions for the illumination control system that improves system performance. FIG. 23 is a flowchart of an example method 2300 for generating actions that improve performance of an illumination control system using an agent executing a machine learning model that includes an artificial neural net trained using an actor-critic method. Method 2300 can include any number of additional or fewer steps, or the steps may be accomplished in a different order.

At 2302, the agent determines an input state vector for the machine learning model. The elements of the input state vector can be determined from any number of measurements received from the sensors, such as sensors 1506. In this example, each measurement is a measurement that represents a state of an area of an environment around the illumination control system and, particularly, measurements used to indicate whether an implement is positioned adjacent to a vehicle.

At 2304, the agent inputs the input state vector into the machine learning model. Each element of the input vector is connected to any number of the input neural units. The machine learning model represents a function configured to generate actions to improve the performance of the illumination control system from the input state vector. Accordingly, the machine learning model generates an output in the output neural units predicted to improve the performance of the illumination control system. In some implementations, the output neural units are connected to the elements of an output action vector and each output neural unit can be connected to any element of the output action vector. Each element of the output action vector is an action executable by a component of the illumination control system, such as a light source 1508. In some examples, the agent determines a set of machine commands for the components based on the elements of the output action vector.

At 2306, the agent sends the machine commands to a controller that operate the components, such as controller 1502, and the controller actuates the components based on the machine commands in response. Actuating the components executes the action determined by the machine learning model. Further, actuating the components changes the state of the environment and sensors measure the change of the state.

Upon completion of 2306, the method 2300 returns to 2301, and the agent again determines an input state vector to input into the machine learning model and determines an output action and associated machine commands that actuate components of the illumination control system. For example, a result of 2306 may actuate a plurality of light sources, with some of the light sources providing illimitation to a detected implement while other light sources not providing illumination to the detected implement. In such a case, the detected implement may be partially illuminated with light provided by some of the light sources and with some light generated by other light sources being directed into other areas of the environment not occupied by the detected implement. The light not being used to illuminate the detected implement is unnecessary, since the light does not serve to illuminate at least a portion of the detected implement. Subsequent loops of method 2300 operate to refine the output of the illumination control system, such as by preventing operation of light sources whose light does not illuminate a detected implement. Further, the subsequent loops of method 2300 may also result in operation of other light sources that do provide light to illuminate the detected implement. Thus, over time, the agent works to increase the performance of the illumination control system.

In some implementations, an agent may execute a machine learning model that is not actively being trained using the reinforcement techniques. In such cases, the agent can be a model that is independently trained using the actor-critic methods described earlier. That is, the agent is not actively rewarding connections in the neural network. The agent can also include various models that have been trained to optimize different performance metrics of an illumination control system. A user may select between performance metrics to optimize, and thereby change the machine learning model, using a user interface, such as user interface 1520.

In other implementations, the agent may actively train a machine learning model using reinforcement techniques. In such cases, the machine learning model generates a reward vector including a weight function that modifies the weights of any of the connections included in the machine learning model. The reward vector can be configured to reward various metrics including the performance of an illumination control system as a whole, reward a state, reward a change in state, etc. In some examples, a user can select which metrics to reward using the user interface of the illumination control system.

Figure 24:
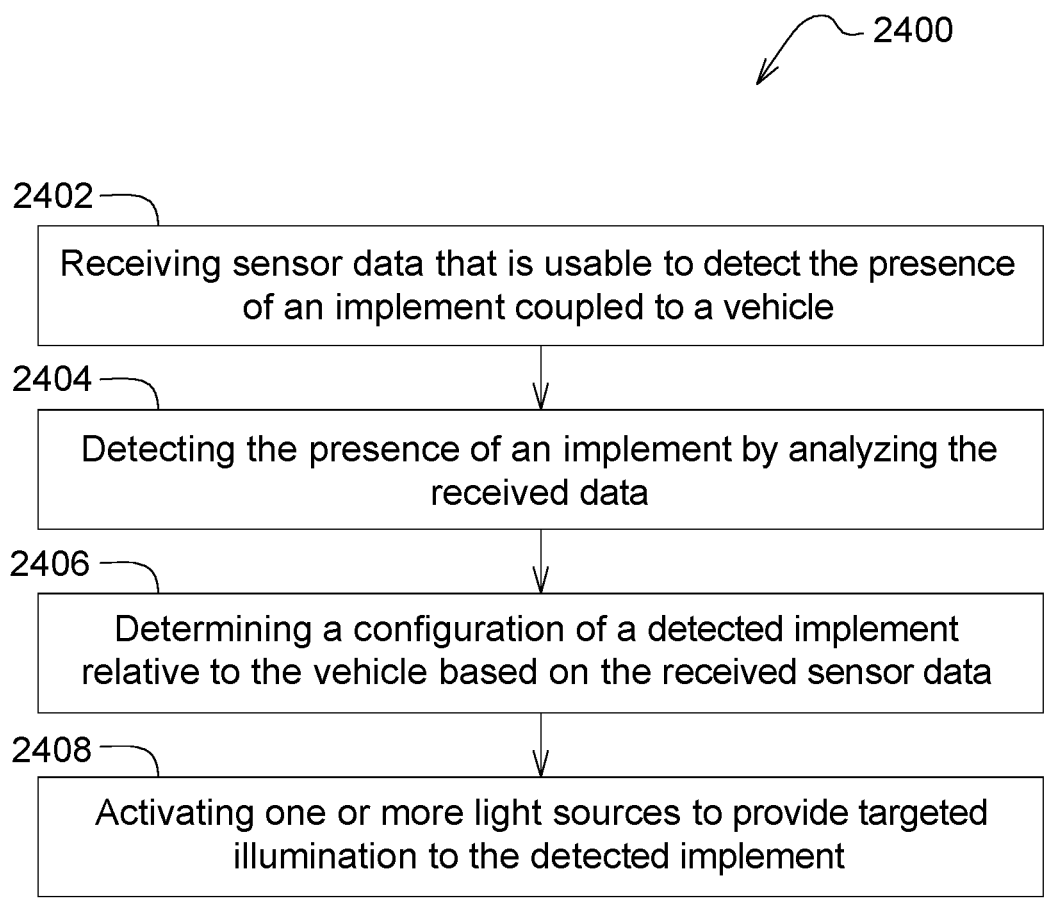
FIG. 24 is a flow chart of an example method for providing targeted illumination to one or more implements coupled to a vehicle, according to some implementations of the present disclosure.

FIG. 24 is a flowchart of an example method 2400 for providing targeted illumination to one or more implements coupled to a vehicle, such as an agricultural vehicle. The agricultural vehicle may include an illumination control system, such as illumination control system 1500. At 2402, sensor data that is usable to detect the presence of an implement coupled to the agricultural vehicle is received, and, at 2404, the presence of an implement is detected by analyzing the received sensor data. In some implementations, an agent, such as an agent resident on a controller, may be used to detect an implement using machine learning and the received sensor data. The sensors may include, for example, a camera, a light sensor, laser, a lidar, or other types of sensors operable to obtain information that is usable to detect the presence of an implement. Further, the one or more sensors may form part of an illumination control system, such as an illumination control system as described herein. At 2406, a configuration of the detected implement relative to the vehicle is determined. For example, determining a configuration of a detected implement relative to a vehicle may include determining a side on which the detected implement is located relative to the vehicle (e.g., whether the detected implement is positioned in front of or behind the vehicle); determining an extent to which the implement longitudinally extends relative to the vehicle (e.g., an amount by which the detected implement longitudinally extends from the vehicle); and determining an amount by which the implement extends laterally relative to the vehicle (e.g., an amount by which the detected implement laterally extends from a centerline of the vehicle) may be determined by the agent. The agent may determine the configuration of the detected implement using a machine learning, such as a machine learning model described earlier, or any other machine learning technique encompassed by the present disclosure.

At 2408, light sources are activated to provide targeted illumination to the detected implement. In some implementations, the targeted illumination illuminates the entirety of the detected implement while preventing activation of light sources whose illumination would not illuminate the detected implement. Further, in some implementations, a brightness level of illumination directed to the implement may also be selected based on a location of the detected implement or portion of the detected implement relative to the agricultural vehicle. A brightness level may be selected by activating one or more light sources that produce light having a selected brightness, or a brightness level of one or more light sources may be adjusted to provide the selected brightness. For example, illumination having a first brightness may be applied to one or more portions of the detected implement having a distance from the vehicle within a first distance range, and illumination having a second brightness may be applied to one or more other portions of the detected implement having a distance from the vehicle within a second distance range. Thus, in some implementations, increased brightness may be applied to portions of the detected implement that are a greater distance from light sources provided on the agricultural vehicle than other parts of the implement in order to provide a desired level of illumination. Further, illumination from a light source to areas around the vehicle not occupied by the implement may be prevented. As a result, targeted illumination is provided to illuminate the implement while eliminating or reducing release of illumination not used to illuminate the implement. As a result, glare is reduced, power consumption is reduced, and improved illumination of the implement is provided.

Artificial intelligence within the scope of the present disclosure includes machine learned models that automatically determine, in real-time, actions to affect components of an illumination control system to improve performance of the illumination control system. In one example, a machine learning model is trained using a reinforcement learning technique. Machine learning models trained using reinforcement learning excel at recognizing patterns in large interconnected data structures, herein applied to the measurements from one or more sensors (such as image data from one or more cameras), without the input of an operator. The machine learning model can generate actions for the illumination control system that are predicted to improve the performance of the illumination control system based on those recognized patterns. For example, the machine learning model learns to identify the presence of and position of an implement relative to a vehicle. Accordingly, illumination control systems within the scope of the present disclosure may utilize a machine learning model trained using reinforcement learning. This machine learning model training allows the illumination control system to operate more efficiently with less input from an operator. Among other benefits, reduced operator input helps reduce operator fatigue and distraction, for example in the case where the operator is also driving an agricultural vehicle to which the illumination control system is attached.

Other types of lighting systems are also encompassed within the scope of the present disclosure. In some implementations, an example lighting system 3000 may include an electronic computer, which may be or include a controller 3002, and a plurality of light sources 3004. Although four light sources 3004 are illustrated, additional or fewer light sources 3004 may be included. The light sources 3004 may be positioned to provide illumination to particular areas located about a vehicle, such as vehicle 100 shown in FIGS. 1 and 26. The controller 3002 also includes a processor 3003 and memory 3008 communicably coupled to each other. As described in more detail below, the processor 3003 is operable to execute instructions and can manipulate data, and memory 3008 is operable to store data and information. Particularly, the processor 3003 is operable, for example, to execute instructions to configure the light sources 3004 and activate and deactivate the light sources, and the memory 3008 is, for example, operable to store instructions, such as in the form of one or more computer programs. The instructions, when loaded onto the processor, defines how the processor 3003 and, hence, the lighting system 3000 operates. The lighting system 3000 includes an interface 3005 and is coupled to an implement 3007 via a wired or wireless connection 3009 via the interface 3005.

The lighting system 3000 also includes a user interface 3006 and a display 3010. The user interface 3006 allows a user to interact with the lighting system 3000, such as by providing input to the lighting system 3000. The display 3010 is operable to display output from the computer system 3000 and may provide a graphical user interface to present information to a user. In some implementations, the display 3010 may include a touch screen. Thus, in some implementations, the user interface 3006 and the display 3010 may be combined into a single device.

The lighting system 3000 may arrange one or a plurality of the light sources 3004 into different groups that may be selectively activated or deactivated simultaneously, such as via interaction with a user interface 3006. The user interface may be any of the types of user interfaces described herein. Particularly, the user interface 3006 may be a touch screen display, and the different groupings of light sources 3004 may be indicated on the touch screen display as an icon. A user may touch one of the icons to activate the light source 3004 or group of light sources 3004 associated with the selected icon. The user may select the icon again to deactivate the associated light source 3004 or group of light sources 3004. Thus, selecting the icon permits a user to toggle between activation and deactivation of the associated light source 3004 or group of light sources 3004. Each of the icons may represent a different light source 3004 or group of light sources 3004 to provide a different illumination pattern about the vehicle. In other implementations, other types of user interfaces may be used to selectively operate a light source 3004 or group of associated light sources 3004 to produce an illumination pattern about the vehicle. For example, one group of light sources 3004 may provide illumination to an implement being pulled over the ground, such as a field, in a folded configuration (i.e., a configuration in which one or more part of the implement are stowed in order to reduce a dimension of the implement), while another group of light sources 3004 may provide illumination to the implement in an unfolded configuration.

In some implementations, a user may interact with the lighting system, such as via the user interface 3006, to define the size of an implement, such as a lateral and longitudinal extent of an implement, row spacing, or other characteristics used to define a size of the implement, and store that information within memory 3008 of the lighting system 3000. The user may also input a position of an implement whose dimensions have been stored in the memory 3008 to identify a position of the implement relative to the vehicle. For example, referring to FIG. 12, a user my select that an implement is positioned at one of three positions trailing the vehicle 1200, e.g., a position at which implement 1202 is located, a position at which implement 1204 is located, or a position at which implement 1206 is located. Based on the defined size of the implement and position thereof relative to the vehicle (and, consequently, the lighting system when coupled to the vehicle), the illumination system 3000 activates the light source 3004 or group of light sources 3004 that will fully illuminate the implement 3007 based on its size and position when the user selects an icon, for example, provided on the user interface.

In some implementations, defining which light source 3004 or group of light sources 3004 to be used to illuminate an implement may be received from the implement. For example, an implement may include stored information relating to a size and shape of the implement, a position that the implement would occupy relative to the vehicle, or other information which may be used by the lighting system 3000 to select, automatically, which light source 3004 or sources 3004 may be used to illuminate the implement. In other implementations, the information stored on the implement may particularly identify which light sources 3004 are to be used to illuminate the implement or a configuration of one or more light sources, e.g., orientation, brightness (intensity), or beam size. The stored information may be transmitted to the lighting system 3000 either over the wired or wireless connection 3009 to the lighting system 3000. Further, in some implementations, the lighting system 3000 is operable to detect a position of the implement, such as when the implement is part of a train (such as the train of implements shown in FIG. 12). The lighting system 3000 may receive information, for example, based on a position of the implement relative to the vehicle, based on where implement is connected in an implement train (e.g., receiving information that the implement is directly coupled to the vehicle, such as the implement 1202 shown in FIG. 12, or that the implement is directly coupled to another implement in the implement train, such as the implement 1204 that is directly coupled to implement 1202, as shown in FIG. 12). Alternatively, the position information may be in the form of GPS information or may be detected using video images from one or more cameras. The video images may be used in combination with machine learning to detect the presence of the implement, as described earlier. The lighting system 3000 may also receive information related to how the implement is configured, e.g., whether the implement is positioned laterally more to one side of the vehicle than another, whether the implement 3007 is in the folded or unfolded configuration, etc., or the lighting system 3000 may receive configuration information from the implement or the vehicle that alters which light source 3004 or light sources 3004 should be activated to provide illumination to the implement, an orientation of the light sources, a brightness of the light sources, a beam size of the light sources, etc.

Thus, in some implementations, the lighting system 3000 may be operable to automatically identify an implement 3007, a size of the implement, and a configuration of the implement and automatically select, configure, or both one or more light sources 3004 to be used to illuminate the implement (e.g., fully illuminate the implement) in response. Further, the lighting system 3000 may be operable to alter which light sources 3004 are used for illumination in realtime based on updated information received from the vehicle or the implement 3007 to reflect a change in configuration of the implement 3007 or a position of the implement 3007 relative to the vehicle.

The information received from the implement 3007 or information from the vehicle relating to the implement 3007 may be received via a bus network. In some implementations, the information may be transmitted over a controller area network, also referred to as a CAN bus network. Thus, the information related to the implement 3007, e.g., size, shape, configuration, position relative to the vehicle, etc., may be transmitted to the lighting system 3000 via a bus and, in some instances, a CAN bus. The lighting system 3000 may communicate with the bus via the interface 3005, which is described in more detail below. As explained above, the lighting system 3000 may also control an orientation of one or more of the light sources 3004 (e.g., to adjust where illumination is projected), adjust an intensity of one or more of the light sources 3004, or adjust a size of a beam projected from one ro more of the light sources 3004. One or more of these adjustments may be made to provide a desired amount of illumination to the implement 3007, e.g., fully illuminating the implement 3007.

In still other implementations, an implement 3007 may include a light source or group of light sources that are operable to illuminate, e.g., fully illuminate, the implement. Thus, communication between the controller 3002 and the implement 3007 may flow in both directions. The implement 3007 may both receive from and transmit information to the controller 3002, and the controller 3002 may both receive from and transmit information to the implement 3007.

In other implementations, an implement may include one or more light sources. An operator of a vehicle coupled to the implement may selectively operate the lights included on the implement, or the lights provided on the implement may be controlled automatically to provide illumination to the implement or another implement located near the implement. The light sources provided on an implement may form part of the illumination system. A lighting system, which may be similar to lighting system 3000, may be operable to receive an operator's inputs to activate or deactivate the light source or group of light sources provided on the implement to provide illumination. Alternatively, a controller of the lighting system may automatically control which of the light sources of the implement are activated, a direction in which the illumination is directed, an intensity of the produced illumination, or a beam size of the produced illumination, for example. An amount by which the illumination extends beyond the implement may vary based on, for example, the type of implement, the manner in which the implement is being used, or the speed of the vehicle.

The various implementations may include light sources that are adjustable in both intensity, position, or both. For example, in some cases, one or more of the light sources may have a position that is electronically adjustable. A lighting system within the scope of the present disclosure may be operable to adjust a position of one or more of the light sources in order to provide a desired level of illumination, such as complete illumination of the implement. The adjustability of the light sources may be automatically controlled to position the light sources to provide a desired pattern of illumination, e.g., provide full illumination of the implement. The information used to position or reposition the light sources may be the result of information relating to the implement (e.g., size, configuration, position, etc.) obtained in any of the ways described herein, e.g., via machine learning analysis of images, information received from the implement, etc. Adjustment of the light sources may be performed by an actuator coupled to or associated with the light source (e.g., to adjust where light from the light source is projected), adjustable optics within the light sources (e.g., to adjust a beam of light emitted by the light source), or adjustable lighting component of the light source that produces illumination (e.g., to adjust a brightness of the illumination produced by the light source), to name a few. Each of the adjustments may be performed using electronics controlled via one or more electrical signals, which may be produced by a lighting system in response to received information. Each of the adjustments may be made independent of the others.

In still other implementations, a lighting system within the scope of the present disclosure may adjust a light pattern applied to an implement, which may include selecting which light sources are activated, adjusting a location to where the illumination is directed (e.g., altering where one or more the light sources are aimed), adjusting an intensity of the light sources, or adjusting a size of a beam projected from the light sources.

In some implementations, a lighting system may be operable to actively adjust light sources in real-time, for example, to adjust illumination provided to an implement, area around the implement, or both. The real-time adjustment may be used to alter the illumination provided to the implement or surrounding area in order to actively adjust to changing conditions. For example, the lighting system may deactivate one or more light sources, adjust a brightness (e.g., dim) illumination from one or more light sources, or alter a location at which produced illumination from one or more light sources is directed when the illumination produces glare above a selected threshold. The amount of glare may be measured by one or more sensors, such as one or more light sensors or cameras located, in, on, or near an operator's cabin of a vehicle. Thus, the sensed glare may be representative of glare experience by an operator in the operator's cabin. The lighting system is communicably coupled to the sensors and utilizes the received sensor information to determine which light source or light sources are generating glare at or above a selected level, and, in response, sending control signals to alter operation of the one or more light sources in one or more of the manners described to reduce the glare to below the selected level.

Further, a lighting system may utilize the one or more sensors to detect, for example, in real-time, when light applied to the implement is failing to illuminate the implement or surrounding area to a selected level. For example, the sensors may detect one or more portions of an implement that is illuminated to a level below a selected level and alter the illumination provided by one or more light sources, for example, in one or more of the ways described above, to increase an amount of illumination applied to the one or more portions. In some implementations, machine learning may be used to detect levels of illumination on one or more regions of the implement that are outside of a selected level and alter one or more of the light sources to alter the level of illimitation applied to those regions. For example, the lighting system may detect one region having reflected illumination that is above a selected level and respond by reducing a level of illumination applied to that region. At the same time or at a different time, the lighting system may detect a region of the implement whose reflected illumination is below a selected level and respond by increasing the amount of illumination applied to that region. Real time control of the light sources may actively adjust illumination as a result of, for example, changes in topography that alter how light is reflected from the implement, changes in direction of the vehicle to which the implement is coupled, which may also adjust how light is reflected from the implement. Changes in levels of reflected light, regardless of the cause therefor, are monitored and adjusted so that the reflected light remains at a selected level or within a selected range of illumination. As explained above, machine learning may be used to detect the reflected level of illumination and identify the region of the implement from which the light is reflected and alter the light levels in response.

Similar control may be applied to levels of illumination on the ground adjacent to the implement. Light levels on the ground at different locations may be detected, for example, using machine learning, and light levels at one or more regions of the ground may be altered to produce a selected level of illumination. Further, control of the illumination provided by the light sources may be performed on an ongoing basis in real-time.

Figure 25:
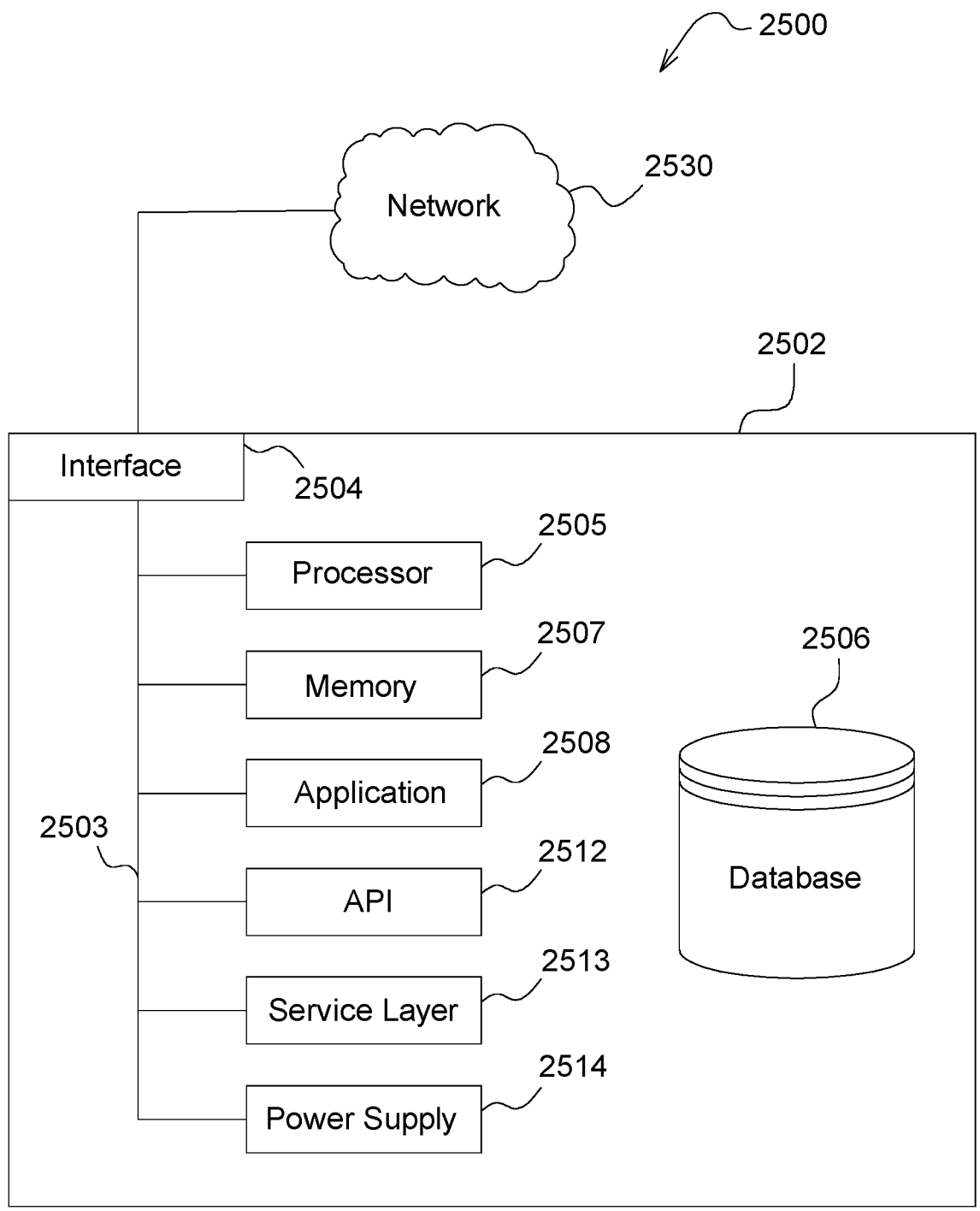
FIG. 25 is a block diagram illustrating an example computer system used to provide computational functionalities associated with described algorithms, methods, functions, processes, flows, and procedures as described in the present disclosure, according to some implementations of the present disclosure.

FIG. 25 is a block diagram of an example computer system 2500 used to provide computational functionalities associated with described algorithms, methods, functions, processes, flows, and procedures described in the present disclosure, according to some implementations of the present disclosure. The illustrated computer 2502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2502 can include input devices such as keypads, keyboards, and touch screens that can accept user information. Also, the computer 2502 can include output devices that can convey information associated with the operation of the computer 2502. The information can include digital data, visual data, audio information, or a combination of information. The information can be presented in a graphical user interface (UI) (or GUI).

The computer 2502 can serve in a role as a client, a network component, a server, a database, a persistency, or components of a computer system for performing the subject matter described in the present disclosure. The illustrated computer 2502 is communicably coupled with a network 2530. In some implementations, one or more components of the computer 2502 can be configured to operate within different environments, including cloud-computing-based environments, local environments, global environments, and combinations of environments.

At a high level, the computer 2502 is an electronic computing device operable to receive, transmit, process, store, and manage data and information associated with the described subject matter. According to some implementations, the computer 2502 can also include, or be communicably coupled with, an application server, an email server, a web server, a caching server, a streaming data server, or a combination of servers.

The computer 2502 can receive requests over network 2530 from a client application (for example, executing on another computer 2502). The computer 2502 can respond to the received requests by processing the received requests using software applications. Requests can also be sent to the computer 2502 from internal users (for example, from a command console), external (or third) parties, automated applications, entities, individuals, systems, and computers.

Each of the components of the computer 2502 can communicate using a system bus 2503. In some implementations, any or all of the components of the computer 2502, including hardware or software components, can interface with each other or the interface 2504 (or a combination of both), over the system bus 2503. Interfaces can use an application programming interface (API) 2512, a service layer 2513, or a combination of the API 2512 and service layer 2513. The API 2512 can include specifications for routines, data structures, and object classes. The API 2512 can be either computer-language independent or dependent. The API 2512 can refer to a complete interface, a single function, or a set of APIs.

The service layer 2513 can provide software services to the computer 2502 and other components (whether illustrated or not) that are communicably coupled to the computer 2502. The functionality of the computer 2502 can be accessible for all service consumers using this service layer. Software services, such as those provided by the service layer 2513, can provide reusable, defined functionalities through a defined interface. For example, the interface can be software written in JAVA, C++, or a language providing data in extensible markup language (XML) format. While illustrated as an integrated component of the computer 2502, in alternative implementations, the API 2512 or the service layer 2513 can be stand-alone components in relation to other components of the computer 2502 and other components communicably coupled to the computer 2502. Moreover, any or all parts of the API 2512 or the service layer 2513 can be implemented as child or sub-modules of another software module, enterprise application, or hardware module without departing from the scope of the present disclosure.

The computer 2502 includes an interface 2504. Although illustrated as a single interface 2504 in FIG. 25, two or more interfaces 2504 can be used according to particular needs, desires, or particular implementations of the computer 2502 and the described functionality. The interface 2504 can be used by the computer 2502 for communicating with other systems that are connected to the network 2530 (whether illustrated or not) in a distributed environment. Generally, the interface 2504 can include, or be implemented using, logic encoded in software or hardware (or a combination of software and hardware) operable to communicate with the network 2530. More specifically, the interface 2504 can include software supporting one or more communication protocols associated with communications. As such, the network 2530 or the interface's hardware can be operable to communicate physical signals within and outside of the illustrated computer 2502.

The computer 2502 includes a processor 2505. Although illustrated as a single processor 2505 in FIG. 25, two or more processors 2505 can be used according to particular needs, desires, or particular implementations of the computer 2502 and the described functionality. Generally, the processor 2505 can execute instructions and can manipulate data to perform the operations of the computer 2502, including operations using algorithms, methods, functions, processes, flows, and procedures as described in the present disclosure.

The computer 2502 also includes a database 2506 that can hold data for the computer 2502 and other components connected to the network 2530 (whether illustrated or not). For example, database 2506 can be an in-memory, conventional, or a database storing data consistent with the present disclosure. In some implementations, database 2506 can be a combination of two or more different database types (for example, hybrid in-memory and conventional databases) according to particular needs, desires, or particular implementations of the computer 2502 and the described functionality. Although illustrated as a single database 2506 in FIG. 25, two or more databases (of the same, different, or combination of types) can be used according to particular needs, desires, or particular implementations of the computer 2502 and the described functionality. While database 2506 is illustrated as an internal component of the computer 2502, in alternative implementations, database 2506 can be external to the computer 2502.

The computer 2502 also includes a memory 2507 that can hold data for the computer 2502 or a combination of components connected to the network 2530 (whether illustrated or not). Memory 2507 can store any data consistent with the present disclosure. In some implementations, memory 2507 can be a combination of two or more different types of memory (for example, a combination of semiconductor and magnetic storage) according to particular needs, desires, or particular implementations of the computer 2502 and the described functionality. Although illustrated as a single memory 2507 in FIG. 25, two or more memories 2507 (of the same, different, or combination of types) can be used according to particular needs, desires, or particular implementations of the computer 2502 and the described functionality. While memory 2507 is illustrated as an internal component of the computer 2502, in alternative implementations, memory 2507 can be external to the computer 2502.

The application 2508 can be an algorithmic software engine providing functionality according to particular needs, desires, or particular implementations of the computer 2502 and the described functionality. For example, application 2508 can serve as one or more components, modules, or applications. Further, although illustrated as a single application 2508, the application 2508 can be implemented as multiple applications 2508 on the computer 2502. In addition, although illustrated as internal to the computer 2502, in alternative implementations, the application 2508 can be external to the computer 2502.

The computer 2502 can also include a power supply 2514. The power supply 2514 can include a rechargeable or non-rechargeable battery that can be configured to be either user- or non-user-replaceable. In some implementations, the power supply 2514 can include power-conversion and management circuits, including recharging, standby, and power management functionalities. In some implementations, the power-supply 2514 can include a power plug to allow the computer 2502 to be plugged into a wall socket or a power source to, for example, power the computer 2502 or recharge a rechargeable battery.

There can be any number of computers 2502 associated with, or external to, a computer system containing computer 2502, with each computer 2502 communicating over network 2530. Further, the terms "client," "user," and other appropriate terminology can be used interchangeably, as appropriate, without departing from the scope of the present disclosure. Moreover, the present disclosure contemplates that many users can use one computer 2502 and one user can use multiple computers 2502.

Described implementations of the subject matter can include one or more features, alone or in combination.

For example, in a first implementation, a computer-implemented method, including: sensing, with a sensor, a condition of an area; determining the presence of an object within the area based on the sensed condition using machine learning; and selectively actuating one or more light sources to provide targeted illumination to a portion of the area occupied by a detected object and prevent actuating one or more other light sources that provides illumination to portions of the area not occupied by the detected object.

The foregoing and other described implementations can each, optionally, include one or more of the following features:

A first feature, combinable with any of the following features, wherein the sensor is selected from a group consisting of a camera, a light sensor, or a lidar.

A second feature, combinable with any of the previous or following features, wherein the one or more light sources includes a plurality of light sources, wherein illumination provided by the plurality of light sources combine to form an illumination matrix, wherein each light source provides illumination to a different portion of the illumination matrix.

A third feature, combinable with any of the previous or following features, wherein sensing, with a sensor, a condition of an area includes receiving one or more images of the area.

A fourth feature, combinable with any of the previous or following features, wherein determining the presence of an object within the area based on the sensed condition using machine learning includes determining a portion of the area occupied by the detected object.

A sixth feature, combinable with any of the previous features, wherein selectively actuating one or more light sources to provide targeted illumination to a portion of the area occupied by a detected object and prevent actuating one or more other light sources that provides illumination to portions of the area not occupied by the detected object includes selectively actuating the one or more light sources to fully illuminate the detected object.

In a second implementation, a non-transitory, computer-readable medium storing one or more instructions executable by a computer system to perform operations including: sensing, with a sensor, a condition of an area; determining the presence of an object within the area based on the sensed condition using machine learning; and selectively actuating one or more light sources to provide targeted illumination to a portion of the area occupied by a detected object and prevent actuating one or more other light sources that provides illumination to portions of the area not occupied by the detected object.

The foregoing and other described implementations can each, optionally, include one or more of the following features:

A first feature, combinable with any of the following features, wherein the sensor is selected from a group consisting of a camera, a light sensor, or a lidar.

A second feature, combinable with any of the previous or following features, wherein the one or more light sources includes a plurality of light sources, wherein illumination provided by the plurality of light sources combine to form an illumination matrix, wherein each light source provides illumination to a different portion of the illumination matrix.

A third feature, combinable with any of the previous or following features, wherein sensing, with a sensor, a condition of an area includes receiving one or more images of the area.

A fourth feature, combinable with any of the previous or following features, wherein determining the presence of an object within the area based on the sensed condition using machine learning includes determining a portion of the area occupied by the detected object.

A sixth feature, combinable with any of the previous features, wherein selectively actuating one or more light sources to provide targeted illumination to a portion of the area occupied by a detected object and prevent actuating one or more other light sources that provides illumination to portions of the area not occupied by the detected object includes selectively actuating the one or more light sources to fully illuminate the detected object.

In a third implementation, a computer-implemented system, including one or more processors and a non-transitory computer-readable storage medium coupled to the one or more processors and storing programming instructions for execution by the one or more processors, the programming instructions instructing the one or more processors to: sense, with a sensor, a condition of an area; determine the presence of an object within the area based on the sensed condition using machine learning; and selectively actuate one or more light sources to provide targeted illumination to a portion of the area occupied by a detected object and prevent actuating one or more other light sources that provides illumination to portions of the area not occupied by the detected object.

The foregoing and other described implementations can each, optionally, include one or more of the following features:

A first feature, combinable with any of the following features, wherein the sensor is selected from a group consisting of a camera, a light sensor, or a lidar.

A second feature, combinable with any of the previous or following features, wherein the one or more light sources includes a plurality of light sources, wherein illumination provided by the plurality of light sources combine to form an illumination matrix, wherein each light source provides illumination to a different portion of the illumination matrix.

A third feature, combinable with any of the previous or following features, wherein the programming instructions instructing the one or more processors to sense, with a sensor, a condition of an area includes programming instructions instructing the one or more processors to receive one or more images of the area.

A fourth feature, combinable with any of the previous or following features, wherein the programming instructions instructing the one or more processors to determine the presence of an object within the area based on the sensed condition using machine learning includes programming instructions instructing the one or more processors to determine a portion of the area occupied by the detected object.

A sixth feature, combinable with any of the previous features, wherein the programming instructions instructing the one or more processors to selectively actuate one or more light sources to provide targeted illumination to a portion of the area occupied by a detected object and prevent actuating one or more other light sources that provides illumination to portions of the area not occupied by the detected object includes programming instructions instructing the one or more processors to selectively actuate the one or more light sources to fully illuminate the detected object.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Without in any way limiting the scope, interpretation, or application of the claims appearing below, a technical effect of one or more of the example implementations disclosed herein is providing a lighting system that includes a plurality of light sources that are individually selectable to illuminate different portions of an area. With the individual light sources individually operable to provide selective illumination to different portions of an area, such as an area around an agricultural vehicle, targeted light may be provided while avoiding introduction of undesired light into the area that may create glare to an operator of the agricultural vehicle. Another technical effect of one or more of the example implementations disclosed herein is automatically detecting an object, such as an implement, coupled to a vehicle, such as an agricultural vehicle, having an illumination control system. The illumination control system is operable to automatically detect a coupled implement and provide selective and targeted illumination from one or more light sources to illuminate the detected implement while avoiding the introduction of light that does not provide illumination to the detected implement.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. An illumination control system comprising:
   a lighting system comprising a plurality of light sources having an arrangement in which each light source provides selective illumination to different regions of an area;
   a sensor that detects an object within the area surrounding the lighting system; and
   a controller communicably coupled to the lighting system and the sensor to receive a signal from the sensor indicative of a condition of the area, to determine whether the condition reflects an object being positioned adjacent to the lighting system, and selectively to activate one or more of the plurality of light sources to provide targeted visible illumination to visibly illuminate a detected object while preventing visible illumination to portions of the area not occupied by the detected object.

2. The illumination control system of claim 1, further comprising an agent resident on the controller, the agent comprising a machine learning model that utilizes machine learning to detect an object using the signal from the sensor.

3. The illumination system of claim 1, wherein the plurality of light sources are arranged such that each light source directs visible illumination to a portion of the area that is different from portions of the area to which the other light sources of the plurality of light sources direct visible illumination.

4. The illumination system of claim 1, wherein visible illumination provided by the plurality of light sources combine to form an illumination matrix that surrounds the lighting system, wherein each light source provides visible illumination to a different portion of the illumination matrix.

5. The illumination system of claim 4, wherein the controller selectively activates the light sources that provide visible illumination to portions of the illumination matrix occupied by the detected object.

6. The illumination system of claim 1, wherein a portion of the plurality of light sources provide visible illumination that combine to form an illumination zone.

7. The illumination control system of claim 6, wherein the illumination zone defines an annular ring or portion of an annular ring that surrounds the lighting system.

8. The illumination control system of claim 1, wherein the plurality of light sources are arranged in two or more groups, wherein collective visible illumination from each group defines an illumination zone, and wherein the illumination zones is radially offset from each other.

9. The illumination control system of claim 8, wherein light sources within each group provide visible illumination to a discrete portion of the illumination zone, the discrete portions combining to form the illumination zone.

10. A method of selectively illuminating an area, the method comprising:
    sensing, with a sensor, a condition of an area;
    determining the presence of an object within the area based on the sensed condition using machine learning; and
    selectively actuating one or more light sources to provide targeted visible illumination to a portion of the area occupied by a detected object and prevent actuating one or more other light sources that provides visible illumination to portions of the area not occupied by the detected object.

11. The method of claim 10, wherein the sensor is selected from a group consisting of a camera, a light sensor, or a lidar.

12. The method of claim 10, wherein the one or more light sources comprises a plurality of light sources, wherein visible illumination provided by the plurality of light sources combine to form an illumination matrix, wherein each light source provides visible illumination to a different portion of the illumination matrix.

13. The method of claim 10, wherein sensing, with a sensor, a condition of an area comprises receiving one or more images of the area.

14. The method of claim 10, wherein determining the presence of an object within the area based on the sensed condition using machine learning comprises determining a portion of the area occupied by the detected object.

15. The method of claim 10, wherein selectively actuating one or more light sources to provide targeted visible illumination to a portion of the area occupied by a detected object and prevent actuating one or more other light sources that provides visible illumination to portions of the area not occupied by the detected object comprises selectively actuating the one or more light sources to fully illuminate the detected object.

16. An agricultural vehicle comprising:
a body;
an implement connector;
a lighting system coupled to a first portion of the body, the lighting system comprising a plurality of light sources;
a plurality of sensors distributed along a second portion of the body that senses an area adjacent to at least a portion of the body; and
a controller communicably coupled to the lighting system and the plurality of sensors, the controller operable to receive signals from the plurality of sensors, determine the presence of an implement within the sensed area, and selectively actuate one or more of the light sources to provide targeted visible illumination to a detected implement while preventing actuation of other light sources of the plurality of light sources that is to provide visible illumination to a portion of the area not occupied by the detected implement.

17. The agricultural vehicle of claim 16, wherein determination of the presence of an implement is performed using machine learning.

18. The agricultural vehicle of claim 16, wherein the implement is coupled to the implement connector.

19. The agricultural vehicle of claim 16, wherein the plurality of light sources are arranged such that each light sources provides visible illumination to a particular portion of the area.

20. The agricultural vehicle of claim 16, wherein the signals from the plurality of sensors comprise image data.

* * * * *